US012682864B2

(12) United States Patent
Yamamoto et al.

(10) Patent No.: US 12,682,864 B2
(45) Date of Patent: Jul. 14, 2026

(54) LIQUID CRYSTAL DISPLAY DEVICE CAPABLE OF REDUCING POWER CONSUMPTION WITHOUT DEGRADING DISPLAY QUALITY AND METHOD OF DRIVING THE SAME

(71) Applicant: Sharp Display Technology Corporation, Kameyama City (JP)

(72) Inventors: Kaoru Yamamoto, Kameyama City (JP); Kohhei Tanaka, Kameyama City (JP); Keiichi Yamamoto, Kameyama City (JP)

(73) Assignee: Sharp Display Technology Corporation, Kameyama City (JP)

( * ) Notice: Subject to any disclaimer, the term of this patent is extended or adjusted under 35 U.S.C. 154(b) by 24 days.

(21) Appl. No.: 18/621,439

(22) Filed: Mar. 29, 2024

(65) Prior Publication Data

US 2024/0404486 A1 Dec. 5, 2024

(30) Foreign Application Priority Data

May 31, 2023 (JP) ................................ 2023-089886

(51) Int. Cl.
*G09G 3/36* (2006.01)
*G09G 3/20* (2006.01)

(52) U.S. Cl.
CPC ......... *G09G 3/3655* (2013.01); *G09G 3/2092* (2013.01); *G09G 3/3696* (2013.01); *G09G 2310/0289* (2013.01); *G09G 2310/08* (2013.01); *G09G 2330/023* (2013.01)

(58) Field of Classification Search
CPC ............... G09G 3/3655; G09G 3/3696; G09G 2310/0289; G09G 2310/08; G09G 2330/023; G09G 3/2092
See application file for complete search history.

(56) References Cited

U.S. PATENT DOCUMENTS

2002/0180673 A1 12/2002 Tsuda et al.
2011/0175883 A1* 7/2011 Toyotaka ............. G09G 3/3648 345/87
2014/0285413 A1* 9/2014 Miyatake ............. G09G 3/3696 345/87
2014/0368484 A1 12/2014 Tanaka et al.
2016/0027394 A1* 1/2016 Yamamoto ........... G09G 3/3677 345/212
2018/0181243 A1 6/2018 Tsunashima
2024/0062733 A1* 2/2024 Katsuta ................ G09G 3/3696
2024/0062734 A1 2/2024 Katsuta

FOREIGN PATENT DOCUMENTS

JP 2002-182619 A 6/2002

* cited by examiner

*Primary Examiner* — Adam J Snyder
(74) *Attorney, Agent, or Firm* — ScienBiziP, P.C.

(57) ABSTRACT

In a first transition period during which an operation mode transitions from a normal mode to a low power consumption mode, a VCOM generation unit in a power source IC changes a potential of a common electrode drive voltage VCOM from a potential of a first level (for example, 5 V) to a potential of a second level (for example, 12 V) so that a leakage current flowing through a pixel transistor is not generated during a pause period, a gate driver changes a potential of each gate bus line to 0 V, and a source driver changes a potential of each source bus line to 0 V.

16 Claims, 31 Drawing Sheets

| | NORMAL MODE (DRIVEN AT 60 Hz) | LOW FREQUENCY MODE OF THE RELATED ART (DRIVEN AT 0.1 Hz) | SP MODE (DRIVEN AT 0.01 Hz) |
|---|---|---|---|
| SOURCE DRIVER | DRIVEN | PAUSED | PAUSED |
| GATE DRIVER | DRIVEN | DRIVEN | PAUSED |
| POWER SOURCE (VGH, VGL, AVDD, GMA, VDDIO) | DRIVEN | DRIVEN | PAUSED |
| TCON | DRIVEN | DRIVEN | MINIMIZED |

FIG. 18

LIQUID CRYSTAL DISPLAY DEVICE CAPABLE OF REDUCING POWER CONSUMPTION WITHOUT DEGRADING DISPLAY QUALITY AND METHOD OF DRIVING THE SAME

CROSS-REFERENCE TO RELATED APPLICATIONS

This application claims the benefit of priority to Japanese Patent Application Number 2023-089886 filed on May 31, 2023. The entire contents of the above-identified application are hereby incorporated by reference.

BACKGROUND

Technical Field

The following disclosure relates to a liquid crystal display device capable of switching an operation mode between a normal mode and a low power consumption mode, and a method of driving the same.

Liquid crystal display devices are used in various electronic devices such as television receivers, in-vehicle displays such as car navigation devices, notebook computers, and portable terminals such as smartphones and tablet terminals. For such liquid crystal display devices, there has been an increasing demand for lower power consumption. General liquid crystal display devices of the related art are driven at a drive frequency (frame frequency) of 60 Hz. However, the higher the drive frequency becomes, the larger the power consumption becomes, and thus techniques for reducing a drive frequency are actively being developed in order to reduce power consumption. As such a technique, there is known a technique referred to as "pause driving" in which a pause period during which a writing operation of a video signal to a liquid crystal capacitance is stopped is provided. In a liquid crystal display device adopting pause driving, writing of a video signal is performed only in one frame period among a plurality of continuous frame periods, and writing of the video signal is not performed in the remaining periods.

In the liquid crystal display device adopting pause driving, for example, an operation mode is switched between a normal mode in which a drive frequency is set to 60 Hz and a low frequency mode in which a drive frequency is set to 1 Hz. In this regard, for example, switching from the normal mode to the low frequency mode is performed when there is no change in a display image throughout a predetermined period, and switching from the low frequency mode to the normal mode is performed when a user performs some operation or when data is transmitted from the outside. A thin film transistor in which a channel layer is formed of an oxide semiconductor containing indium (In), gallium (Ga), zinc (Zn), and oxygen (O) as main components (hereinafter referred to as an "IGZO-TFT") has an extremely small off-state current, and thus, in a liquid crystal display device adopting pause driving, an IGZO-TFT is typically used as a pixel transistor.

In relation to the disclosure, JP 2002-182619 A discloses that power consumption is reduced by stopping AC driving of a common electrode (counter electrode) and bringing a source driver into a high impedance state in a pause period (a period during which update of a display image is paused).

SUMMARY

In a liquid crystal display device using an IGZO-TFT, power consumption is reduced as compared with a liquid crystal display device of the related art by adopting the above-described pause driving. For example, in a liquid crystal display device used in a notebook computer, a portable terminal, or the like, pause driving is widely adopted. Incidentally, in recent years, there has been an increasing demand for reflective or slightly transmissive large-sized liquid crystal display devices for signage applications, and such large-sized liquid crystal display devices require an external power source even when the above-described pause driving is adopted. For this reason, an installation location is limited. Consequently, a further reduction in power consumption is required such that power consumption can be covered by, for example, a solar cell. Furthermore, even when a reduction in power consumption is achieved, it is not preferable that display quality be degraded as compared with the related art.

According to the technique disclosed in JP 2002-182619 A, a current flowing through an amplifier in the source driver becomes small. However, for example, in a level shifter IC that outputs a gate control signal for controlling the operation of a power source IC or a gate driver (scanning signal line drive circuit), power is consumed even in a pause period. Thus, it is not possible to expect the effect of significantly reducing power consumption as compared with the related art.

Consequently, an object of the following disclosure is to realize a liquid crystal display device capable of significantly reducing power consumption as compared with the related art without degrading display quality.

(1) A liquid crystal display device according to some embodiments of the disclosure is a liquid crystal display device capable of switching an operation mode between a normal mode and a low power consumption mode, the liquid crystal display device including:

a plurality of scanning signal lines;

a plurality of video signal lines intersecting the plurality of scanning signal lines;

a plurality of pixel forming portions each connected to one of the plurality of scanning signal lines and one of the plurality of video signal lines;

a scanning signal line drive circuit configured to drive the plurality of scanning signal lines;

a video signal line drive circuit configured to drive the plurality of video signal lines;

a common electrode provided in common to the plurality of pixel forming portions; and a power source circuit configured to generate a first power source voltage to be supplied to the common electrode, in which each of the plurality of pixel forming portions includes a pixel electrode, a pixel transistor including a control terminal connected to one of the plurality of scanning signal lines, a first conduction terminal connected to one of the plurality of video signal lines, and a second conduction terminal connected to the pixel electrode, the common electrode, and a liquid crystal capacitance formed by the pixel electrode and the common electrode, a period during which the operation mode is set to be the low power consumption mode includes a rewrite period during which a video signal is written to the liquid crystal capacitance and a pause period during which a video signal is not written to the liquid crystal capacitance, in a first transition period during which the operation mode transitions from the normal mode to the low power consumption mode, the power source circuit changes a potential of the first power source voltage from a potential of a first level to a potential of a second level so that a leakage current flowing through the pixel transistor is not generated during the pause period, the scanning signal line drive circuit changes potentials of the plurality of scanning signal lines from a potential of a predetermined off level to 0 V, and the video signal line drive circuit changes potentials of the plurality of video signal lines to 0 V, and in a second transition period during which the operation mode transitions from the low power consumption mode to the normal mode, the scanning signal line drive circuit changes the potentials of the plurality of scanning signal lines from 0 V to the potential of the predetermined off level, and the power source circuit changes the potential of the first power source voltage from the potential of the second level to the potential of the first level.

(2) The liquid crystal display device according to some embodiments of the disclosure includes the configuration of (1), in which, during the pause period, the plurality of video signal lines are maintained in a high impedance state, and a power source of the video signal line drive circuit is maintained in an OFF state.

(3) The liquid crystal display device according to some embodiments of the disclosure includes the configuration of (2), in which the power source circuit further generates a second power source voltage to be supplied to the video signal line drive circuit, and the power source circuit pauses generation of the second power source voltage during the pause period.

(4) The liquid crystal display device according to some embodiments of the disclosure includes the configuration of (1), in which the scanning signal line drive circuit is monolithically formed on a substrate, and a potential of a scanning control signal for controlling an operation of the scanning signal line drive circuit is maintained at 0 V during the pause period.

(5) The liquid crystal display device according to some embodiments of the disclosure includes, in addition to the configuration of (4), a level shifter circuit configured to generate the scanning control signal, in which a power source of the level shifter circuit is maintained in an OFF state during the pause period.

(6) The liquid crystal display device according to some embodiments of the disclosure includes the configuration of (5), in which the power source circuit further generates a third power source voltage to be supplied to the level shifter circuit, and the power source circuit pauses generation of the third power source voltage during the pause period.

(7) The liquid crystal display device according to some embodiments of the disclosure includes the configuration of (1), in which the scanning signal line drive circuit is provided in a form of an integrated circuit chip, and a potential of a scanning control signal for controlling an operation of the scanning signal line drive circuit is maintained at 0 V during the pause period.

(8) The liquid crystal display device according to some embodiments of the disclosure includes, in addition to the configuration of (7), a timing control circuit configured to generate the scanning control signal, in which a power source of the timing control circuit is maintained in an OFF state during the pause period.

(9) The liquid crystal display device according to some embodiments of the disclosure includes the configuration of (7), in which the power source circuit further generates a third power source voltage to be supplied to the scanning signal line drive circuit, and the power source circuit pauses generation of the third power source voltage during the pause period.

(10) The liquid crystal display device according to some embodiments of the disclosure includes the configuration of (1), in which, during the first transition period, the power source circuit changes the potential of the first power source voltage from the potential of the first level to the potential of the second level, and then the scanning signal line drive circuit changes the potentials of the plurality of scanning signal lines from the potential of the predetermined off level to 0 V.

(11) The liquid crystal display device according to some embodiments of the disclosure includes the configuration of (1), in which, during the second transition period, the scanning signal line drive circuit changes the potentials of the plurality of scanning signal lines from 0 V to the potential of the predetermined off level, and then the power source circuit changes the potential of the first power source voltage from the potential of the second level to the potential of the first level.

(12) The liquid crystal display device according to some embodiments of the disclosure includes the configuration of (1), in which the pixel transistor is a thin film transistor in which a channel layer is formed of an oxide semiconductor, the oxide semiconductor being indium gallium zinc oxide containing indium (In), gallium (Ga), zinc (Zn), and oxygen (0) as main components.

(13) The liquid crystal display device according to some embodiments of the disclosure includes the configuration of (1), in which the pixel transistor is a thin film transistor having a dual-gate structure in which two transistors are connected in series.

(14) The liquid crystal display device according to some embodiments of the disclosure includes the configuration (1), in which the pixel transistor is a thin film transistor having a double-gate structure including a top gate and a back gate as the control terminal.

(15) The liquid crystal display device according to some embodiments of the disclosure includes any one of the configurations of (1) to (14), in which a variation range of the potential of the first power source voltage from the potential of the first level to the potential of the second level in the first transition period is equal to a variation range of the potentials of the plurality of scanning signal lines from the potential of the predetermined off level to 0 V in the first transition period.

(16) A driving method according to some embodiments of the disclosure is a method of driving a liquid crystal display device capable of switching an operation mode between a normal mode and a low power consumption mode, the liquid crystal display device including a plurality of scanning signal lines, a plurality of video signal lines intersecting the plurality of scanning signal lines, a plurality of pixel forming portions each connected to one of the plurality of scanning signal lines and one of the plurality of video signal lines, a scanning signal line drive circuit configured to drive the plurality of scanning signal lines,
a video signal line drive circuit configured to drive the plurality of video signal lines,
a common electrode provided in common to the plurality of pixel forming portions, and
a power source circuit configured to generate a first power source voltage to be supplied to the common electrode,
each of the plurality of pixel forming portions including a pixel electrode,
a pixel transistor including a control terminal connected to one of the plurality of scanning signal lines, a first conduction terminal connected to one of the plurality of video signal lines, and a second conduction terminal connected to the pixel electrode,
the common electrode, and
a liquid crystal capacitance formed by the pixel electrode and the common electrode,
a period during which the operation mode is set to be the low power consumption mode including a rewrite period during which a video signal is written to the liquid crystal capacitance and a pause period during which a video signal is not written to the liquid crystal capacitance,
the driving method including:
causing the operation mode to transition from the normal mode to the low power consumption mode, and
causing the operation mode to transition from the low power consumption mode to the normal mode,
in which the causing of the operation mode to transition from the normal mode to the low power consumption mode includes
causing the video signal line drive circuit to change potentials of the plurality of video signal lines to 0 V,
causing the power source circuit to change the potential of the first power source voltage from a potential of a first level to a potential of a second level so that a leakage current flowing through the pixel transistor is not generated during the pause period, and
causing the scanning signal line drive circuit to change potentials of the plurality of scanning signal lines from a potential of a predetermined off level to 0 V, and
the causing of the operation mode to transition from the low power consumption mode to the normal mode includes
causing the power source circuit to change the potential of the first power source voltage from the potential of the second level to the potential of the first level, and
causing the scanning signal line drive circuit to change the potentials of the plurality of scanning signal lines from 0 V to the potential of the predetermined off level.

In the liquid crystal display device according to some embodiments of the disclosure, in a period during which an operation mode is set to be a low power consumption mode, it is not necessary to supply a video signal to a video signal line drive circuit, and it is also not necessary to supply a power source voltage to a scanning signal line drive circuit and a video signal line drive circuit. Thus, in a period during which an operation mode is set to be a low power consumption mode, both an AC component and a DC component of power consumption are greatly reduced as compared with a period during which an operation mode is set to be a normal mode. As described above, power consumption is greatly reduced as compared with the related art. A power source circuit changes the potential of a first power source voltage so that a leakage current flowing through a pixel transistor is not generated during a pause period of a period during which an operation mode is set to be a low power consumption mode. Thus, even when a drive frequency is lowered, display quality is not degraded as compared with the related art. As described above, it is possible to realize a liquid crystal display device capable of significantly reducing power consumption as compared with the related art without degrading display quality.

BRIEF DESCRIPTION OF DRAWINGS

The disclosure will be described with reference to the accompanying drawings, wherein like numbers reference like elements.

FIG. 18 is a diagram illustrating a difference in an operation state of each component among a normal mode, a low frequency mode of the related art, and an SP mode in the first embodiment.

DESCRIPTION OF EMBODIMENTS

Before describing embodiments, terms used in the present specification will be described. In a liquid crystal display device according to each of the following embodiments, the above-described pause driving is performed. In this regard, for convenience of description, pause driving of the related art is referred to as "pause driving of the related art", and pause driving in each of the following embodiments is referred to as "ultra-low power pause driving". In a liquid crystal display device adopting pause driving, an operation mode is switched between a normal mode and a low frequency mode as described above, and a low frequency mode in pause driving of the related art is referred to as a "low frequency mode of the related art" and a low frequency mode in ultra-low power pause driving is referred to as an "SP mode" (Super Pause Mode). A period during which a video signal is written to a liquid crystal capacitance (including a preparation period for writing) is referred to as a "rewrite period", and a period during which a video signal is not written to the liquid crystal capacitance is referred to as a "pause period".

Embodiments will be described below with reference to the accompanying drawings.

1. First Embodiment

1.1 Overall Configuration and Operation Outline

Figure 2:
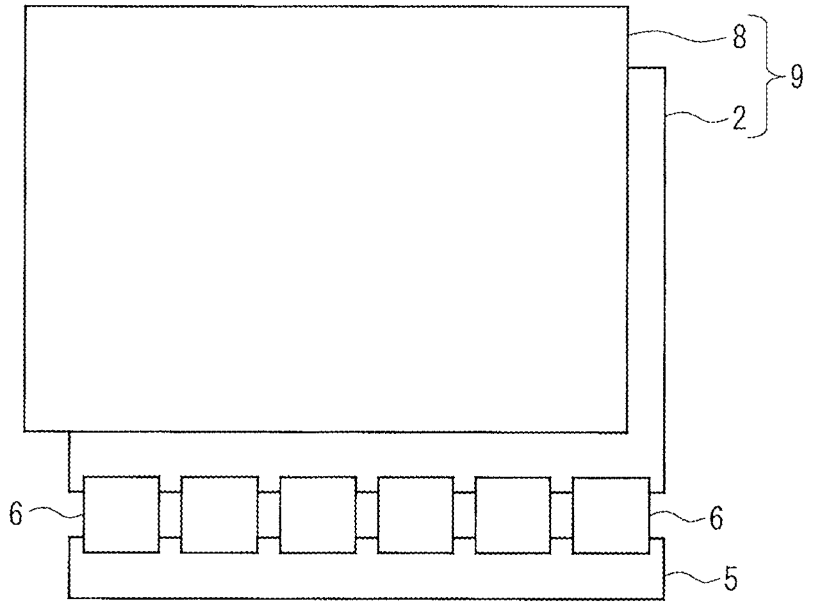
FIG. 2 is a schematic configuration diagram of the liquid crystal display device according to the first embodiment.

FIG. 2 is a schematic configuration diagram of the liquid crystal display device according to the first embodiment. The liquid crystal display device includes a liquid crystal panel 9 including a TFT substrate 2 and a counter substrate 8 which are two glass substrates facing each other, and a system substrate 5. The TFT substrate 2 and the counter substrate 8 are bonded to each other by a sealing member, and liquid crystal is interposed between the TFT substrate 2 and the counter substrate 8. The TFT substrate 2 and the system substrate 5 are connected to each other via a flexible printed circuit (FPC) 6.

Figure 3:
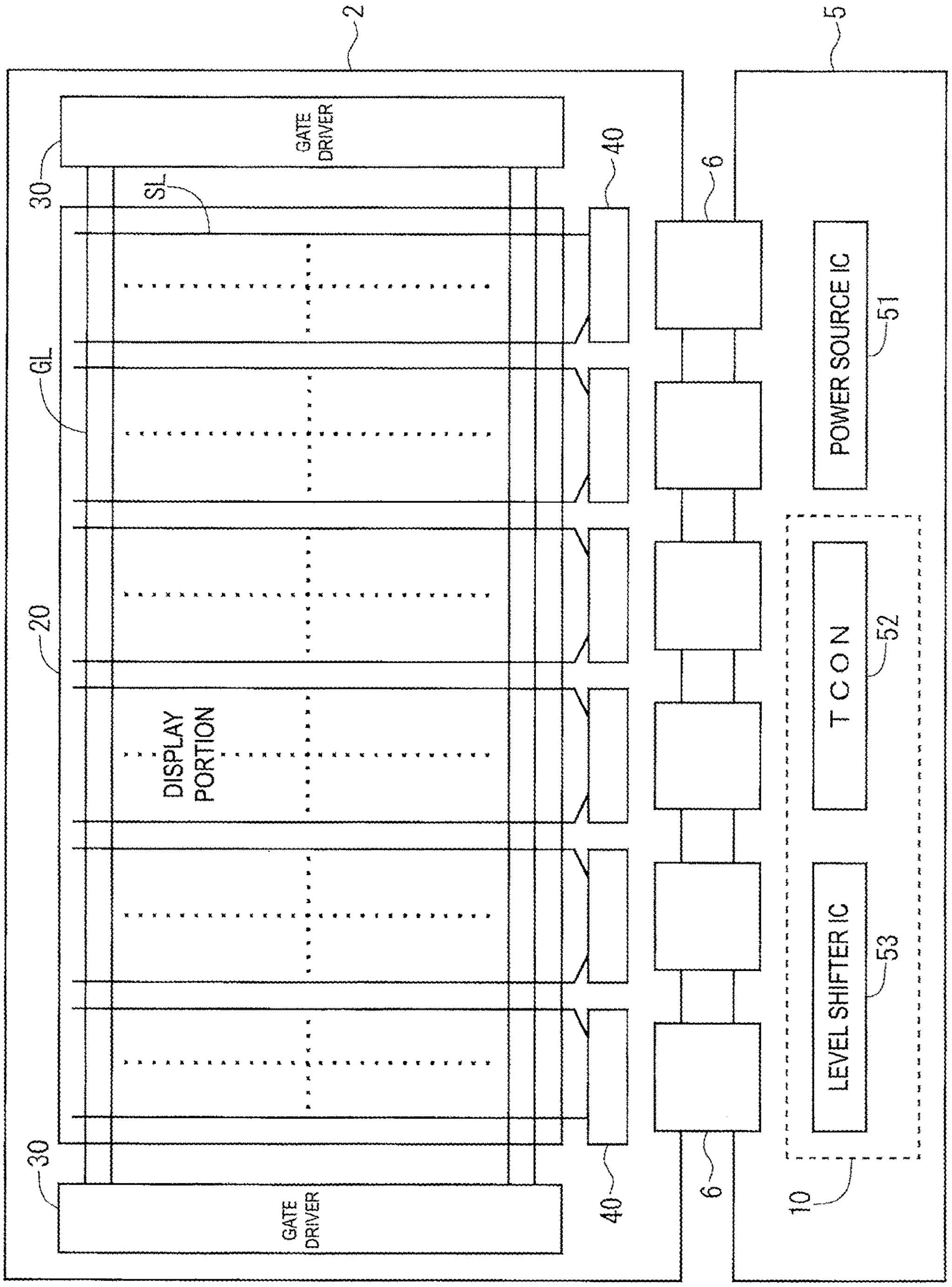
FIG. 3 is a block diagram illustrating components provided on a TFT substrate and components provided on a system substrate in the first embodiment.

FIG. 3 illustrates components provided on the TFT substrate 2 and components provided on the system substrate 5. The TFT substrate 2 is provided with a plurality of gate bus lines (scanning signal lines) GL and a plurality of source bus lines (video signal lines) SL intersecting the plurality of gate bus lines GL. The TFT substrate 2 is provided with a gate driver (scanning signal line drive circuit) 30 that drives the plurality of gate bus lines GL, and a source driver (video signal line drive circuit) 40 that drives the plurality of source bus lines SL. In the present embodiment, the gate driver 30 is monolithically formed on the TFT substrate 2, and the source driver 40 is provided on the TFT substrate 2 in the form of an IC chip (integrated circuit chip). The TFT substrate 2 and the counter substrate 8 are bonded to each other by a sealing member as described above, and a region inside a region where the sealing member is formed serves as a display portion 20. Although the gate driver 30 is provided on both one end side and the other end side of the display portion 20 in the example illustrated in FIG. 3, the disclosure is not limited thereto, and a configuration in which the gate driver 30 is provided only on one end side of the display portion 20 can also be adopted. The number of IC chips as the source driver 40 is also not particularly limited.

The system substrate 5 is provided with a power source IC (power source circuit) 51 that generates various power source voltages, a TCON 52 which is an IC generating a timing signal and the like for controlling the timing in an operation of displaying an image in the display portion 20, and a level shifter IC 53 for changing a voltage level (potential) of a timing signal generated by the TCON 52. In the present embodiment, a display control unit 10 to be described later is realized by the TCON 52 and the level shifter IC 53.

Figure 4:
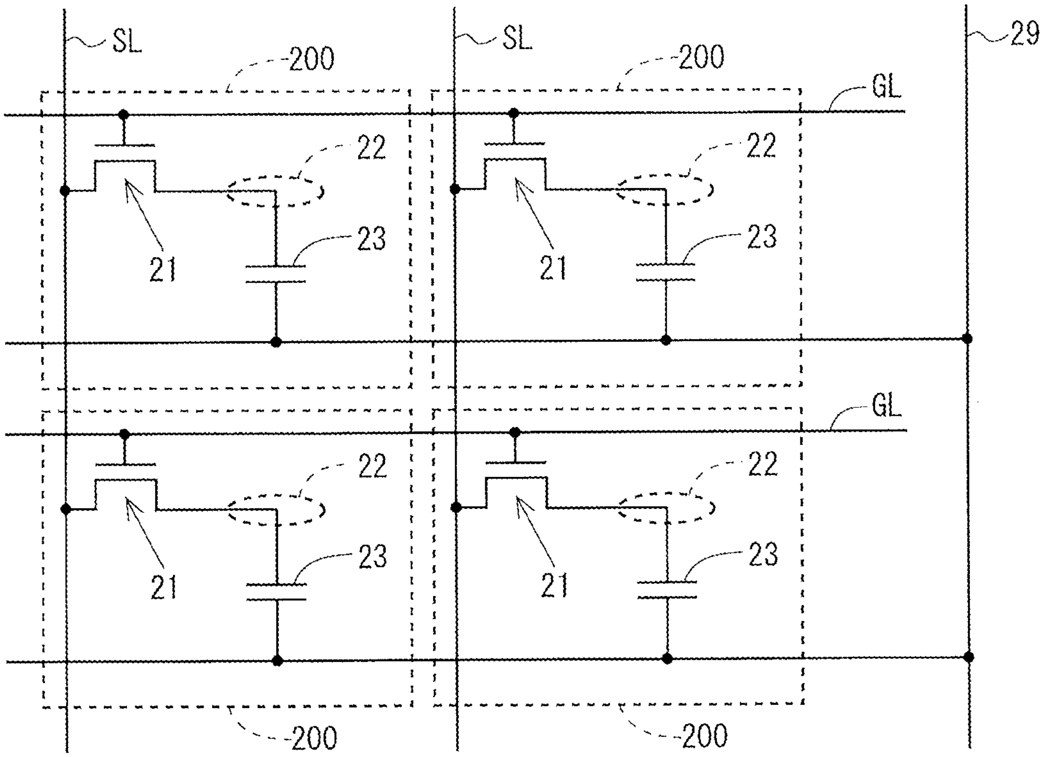
FIG. 4 is a circuit diagram illustrating a configuration of a pixel forming portion in the first embodiment.

The display portion 20 is provided with pixel forming portions 200 for forming pixels so as to correspond to intersections between the plurality of gate bus lines GL and the plurality of source bus lines SL (see FIG. 4). As illustrated in FIG. 4, each pixel forming portion 200 includes a thin film transistor (hereinafter referred to as a "pixel transistor") 21 in which the gate terminal (control terminal) is connected to a gate bus line GL passing through the corresponding intersection, and a source terminal (a first conduction terminal) is connected to a source bus line SL passing through the intersection, a pixel electrode 22 connected to a drain terminal (second conduction terminal) of the pixel transistor 21, a common electrode 29 that is provided in common to the plurality of pixel forming portions 200 in the display portion 20, and a liquid crystal capacitance 23 that is formed by the pixel electrode 22 and the common electrode 29. The pixel transistor 21 in the present embodiment is the above-mentioned IGZO-TFT. The common electrode 29 is provided on the counter substrate 8.

Figure 5:
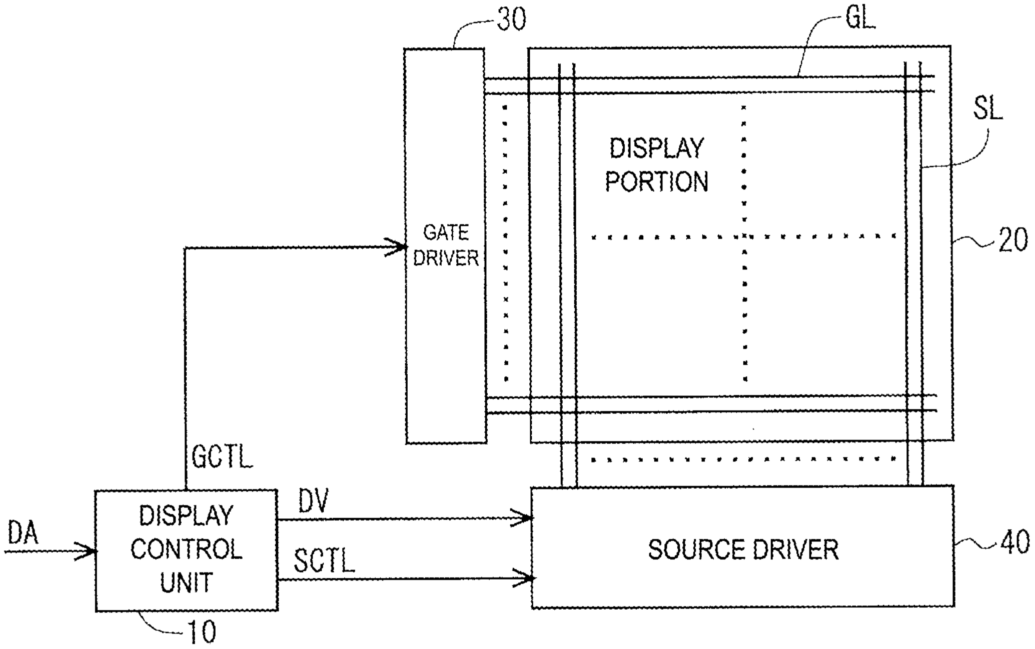
FIG. 5 is a functional block diagram illustrating a functional configuration of the liquid crystal display device according to the first embodiment.

Next, an operation outline of the liquid crystal display devices according to the present embodiment will be described with reference to a functional block diagram illustrated in FIG. 5. As illustrated in FIG. 5, the liquid crystal display device functionally includes the display control unit 10, the display portion 20, the gate driver 30, and the source driver 40. As described above, the display control unit 10 is realized by the TCON 52 and the level shifter IC 53.

The display control unit 10 receives an image signal DA transmitted from a host, and outputs a digital video signal DV, a gate control signal (scanning control signal) GCTL for controlling the operation of the gate driver 30, and a source control signal SCTL for controlling the operation of the source driver 40. That is, the display control unit 10 controls the operation of the gate driver 30 and the operation of the source driver 40. The gate control signal GCTL includes a gate start pulse signal, a clear signal, and a gate clock signal, and the source control signal SCTL includes a source start pulse signal, a source clock signal, a latch strobe signal, and a polarity control signal.

The gate driver 30 repeats application of an active scanning signal to each of the gate bus lines GL in one vertical scanning period as a cycle, based on the gate control signal GCTL transmitted from the display control unit 10. However, in the pause period, the gate driver 30 pauses the operation of applying the scanning signal to the gate bus lines GL.

The source driver 40 applies a driving video signal to each of the plurality of source bus lines SL, based on the digital video signal DV and the source control signal SCTL transmitted from the display control unit 100. However, in the pause period, the source driver 40 pauses the operation of applying the driving video signal to the source bus lines SL.

As described above, the scanning signal is applied to the gate bus lines GL, and the driving video signal is applied to the source bus lines SL, whereby an image based on the image signal DA transmitted from the host is displayed in the display portion 20.

Incidentally, in the liquid crystal display device according to the present embodiment, ultra-low power pause driving is performed in which an operation mode is switched between a normal mode in which a display image is updated in each frame period at a drive frequency of 60 Hz and an SP mode in which a display image is updated only once in a plurality of frame periods at a drive frequency of 0.01 Hz. A period during which an operation mode is maintained in a normal mode is referred to as a "normal mode period", a period during which an operation mode is set to be an SP mode is referred to as an "SP mode period", a period during which the operation mode transitions from the normal mode to the SP mode is referred to as a "first transition period", and a period during which the operation mode transitions from the SP mode to the normal mode is referred to as a "second transition period". The SP mode period includes a pause period significantly longer than a pause period in the low frequency mode of the related art and a rewrite period.

1.2 Detailed Configuration of System Substrate

Figure 6:
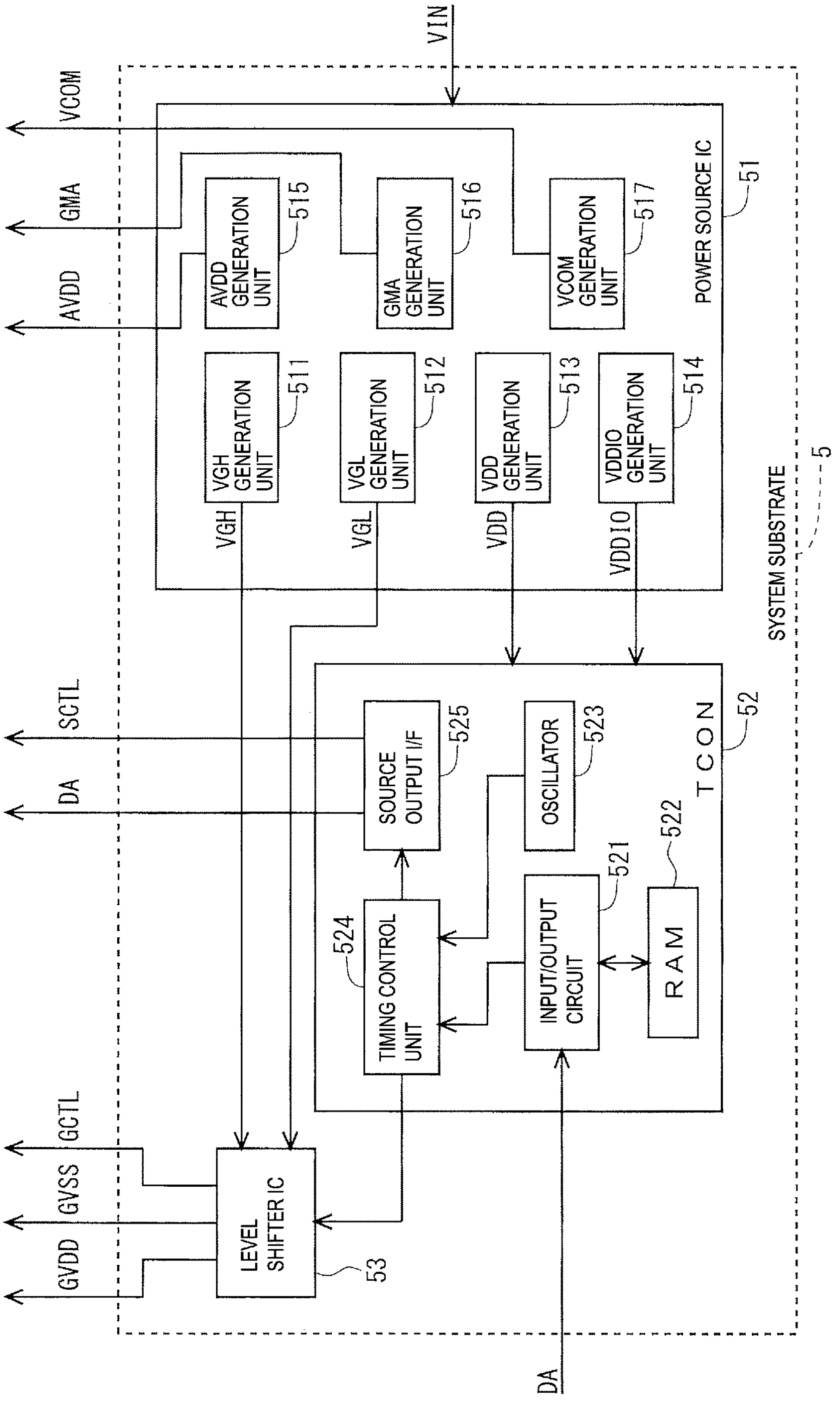
FIG. 6 is a block diagram illustrating a detailed configuration of the system substrate in the first embodiment.

FIG. 6 is a block diagram illustrating a detailed configuration of the system substrate 5 in the present embodiment. As described above, the system substrate 5 is provided with the power source IC 51, the TCON 52, and the level shifter IC 53. An external power source voltage VIN is supplied to the power source IC 51 by a battery or the like.

The power source IC 51 includes a VGH generation unit 511, a VGL generation unit 512, a VDD generation unit 513, a VDDIO generation unit 514, an AVDD generation unit 515, a GMA generation unit 516, and a VCOM generation unit 517. The VGH generation unit 511 generates a gate high power source voltage VGH which is a high-level side power source voltage for operating the gate driver 30. The VGL generation unit 512 generates a gate low power source voltage VGL which is a low-level side power source voltage for operating the gate driver 30. The gate high power source voltage VGH and the gate low power source voltage VGL are supplied to the level shifter IC 53. The VDD generation unit 513 generates a logic power source voltage VDD used in a logic circuit in the TCON 52. The VDDIO generation unit 514 generates an input/output power source voltage VDDIO used in an input/output circuit 521 in the TCON 52. The logic power source voltage VDD and the input/output power source voltage VDDIO are supplied to the TCON 52. The AVDD generation unit 515 generates a source power source voltage AVDD which is a power source voltage for operating the source driver 40. The GMA generation unit 516 generates a gamma power source voltage GMA used to generate a gray-scale voltage in the source driver 40. The source power source voltage AVDD and the gamma power source voltage GMA are supplied to the source driver 40. The VCOM generation unit 517 generates a common electrode drive voltage VCOM. The common electrode drive voltage VCOM is applied to the common electrode 29.

In the present embodiment, a first power source voltage is realized by the common electrode drive voltage VCOM, a second power source voltage is realized by the source power source voltage AVDD and the gamma power source voltage GMA, and a third power source voltage is realized by the gate high power source voltage VGH and the gate low power source voltage VGL.

The TCON 52 includes the input/output circuit 521, a RAM 522, an oscillator 523, a timing control unit 524, and a source output interface (I/F) 525. The input/output circuit 521 receives the image signal DA transmitted from the host and writes the image signal DA to the RAM 522. The input/output circuit 521 also applies the image signal DA extracted from the RAM 522 at an appropriate timing to the timing control unit 524. The RAM 522 temporarily holds the image signal DA transmitted from the host. The oscillator 523 generates a basic clock for operating the timing control unit 524. The timing control unit 524 generates various control signals for controlling the operations of the gate driver 30 and the source driver 40 based on the image signal DA applied from the input/output circuit 521 and the basic clock generated by the oscillator 523. The source output I/F 525 outputs the image signal DA and the above-described source control signal SCTL.

The level shifter IC 53 converts voltage levels (potentials) of various control signals transmitted from the timing control unit 524 into the potential of the gate high power source voltage VGH or the gate low power source voltage VGL to output the gate control signal GCTL, a gate high-level side power source voltage GVDD, and a gate low-level side power source voltage GVSS. The gate control signal GCTL, the gate high-level side power source voltage GVDD, and the gate low-level side power source voltage GVSS are applied to the gate driver 30.

1.3 Gate Driver

Next, the gate driver 30 in the present embodiment will be described below. Here, it is assumed that i gate bus lines GL1 to GLi and j source bus lines SL1 to SLj are arranged in the display portion 20.

Figure 7:
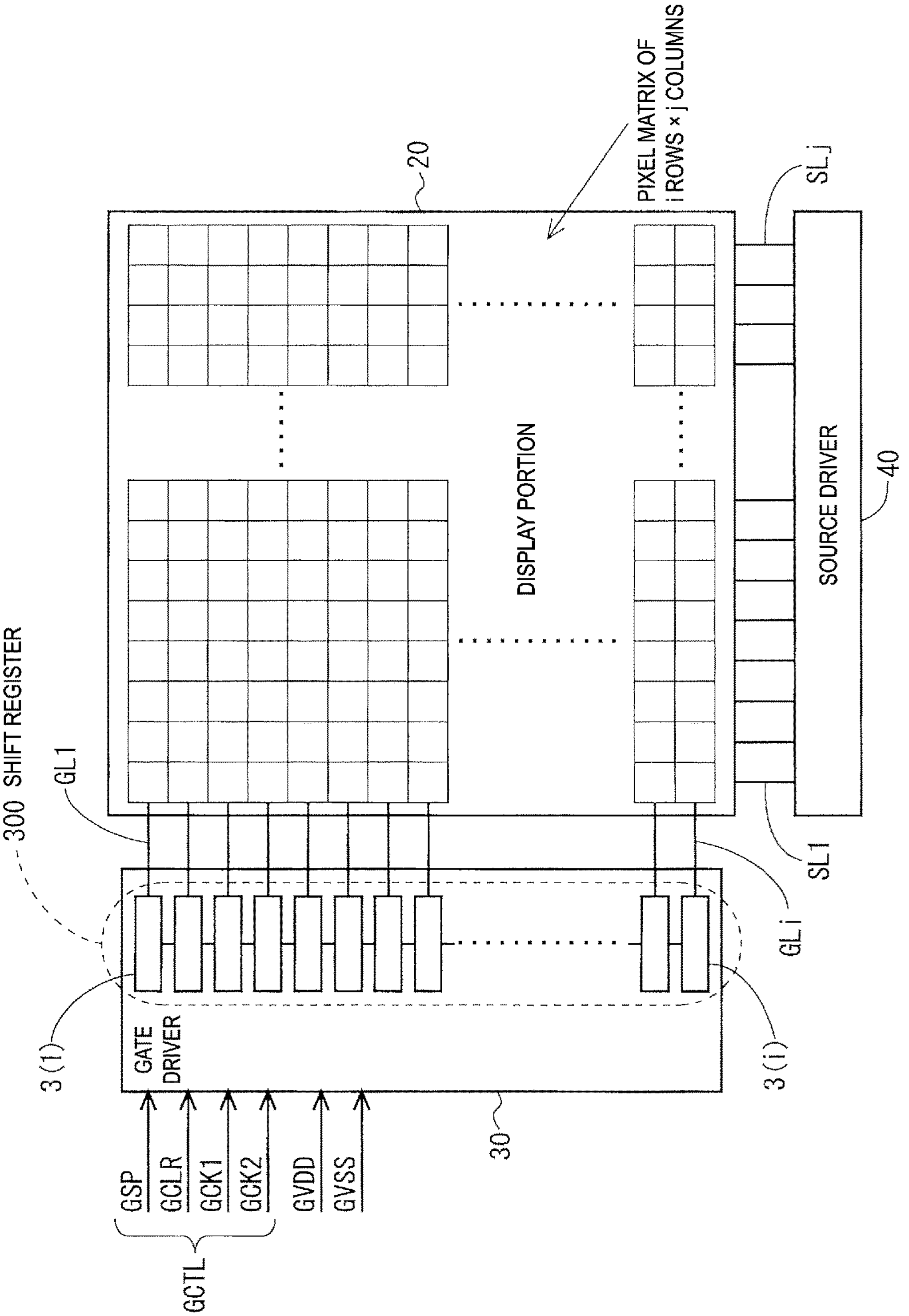
FIG. 7 is a block diagram illustrating a schematic configuration of a gate driver in the first embodiment.

FIG. 7 is a block diagram illustrating a schematic configuration of the gate driver 30 according to the present embodiment. As illustrated in FIG. 7, the gate driver 30 is constituted by a shift register 300 including a plurality of stages. A pixel matrix of i rows×j columns is formed in the display portion 20, the stages of the shift register 300 are provided to correspond to rows of the pixel matrix in a one-to-one manner. That is, the shift register 300 includes i unit circuits 3(1) to 3(*i*). Although a unit circuit as a dummy stage may be provided before the first stage or after the i-th stage, the dummy stage is not directly related to the subject matter of the disclosure, and thus the description thereof is omitted.

1.3.1 Shift Register

Figure 8:
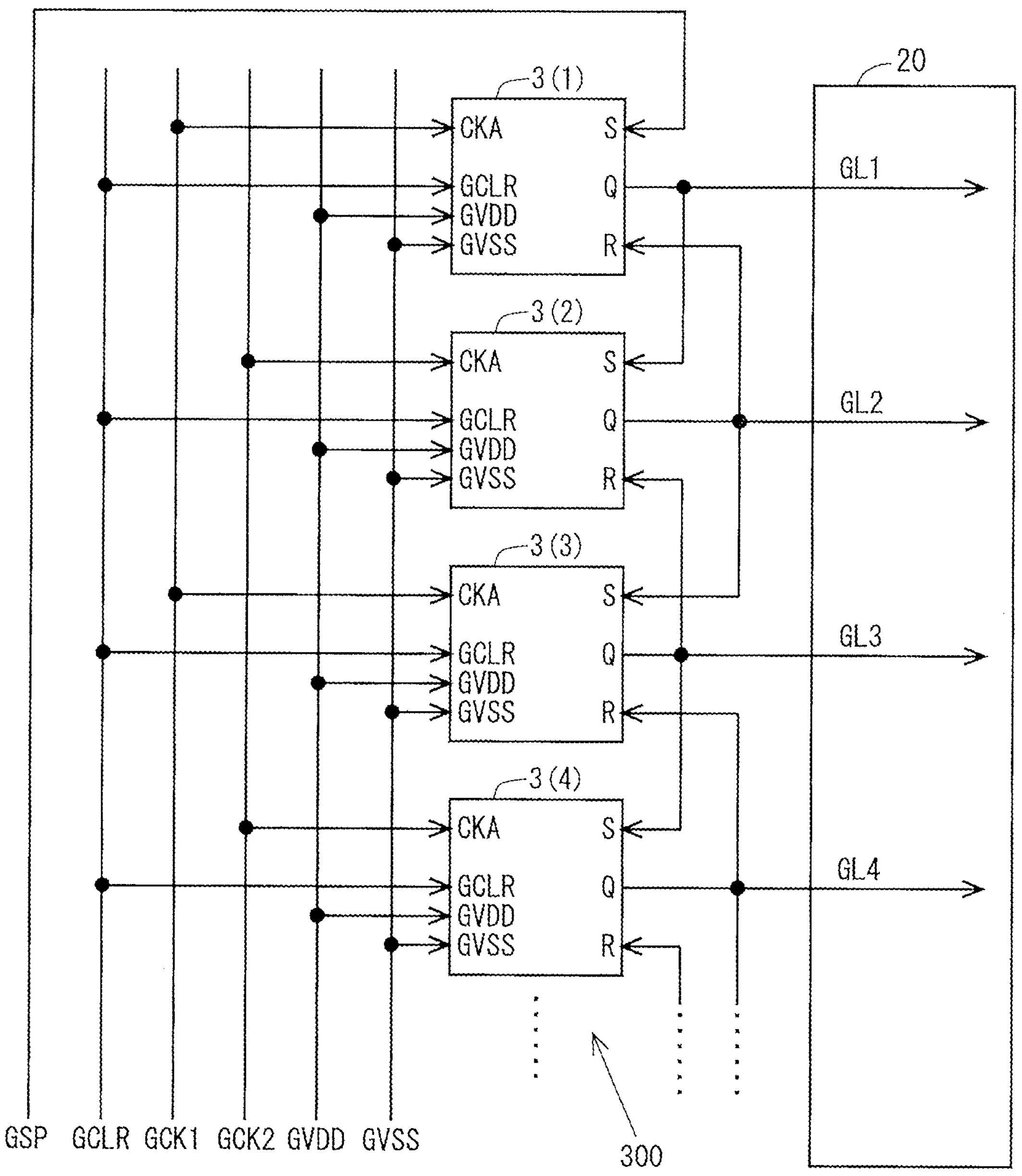
FIG. 8 is a block diagram illustrating a configuration of a shift register in the gate driver in the first embodiment.

FIG. 8 is a block diagram illustrating a configuration of the shift register 300 in the gate driver 30. As described above, the shift register 300 includes i unit circuits 3(1) to 3(*i*). In FIG. 8, the unit circuits 3(1) to 3(4) provided at the first to fourth stages are illustrated. In the following description, reference numeral 3 is attached to the unit circuit when there is no need to distinguish the i unit circuits 3(1) to 3(*i*) from each other.

As the gate control signals GCTL, a gate start pulse signal GSP, a clear signal GCLR, and gate clock signals GCK1 and GCK2 are applied to the shift register 300. The gate clock signals GCK1 and GCK2 are two-phase clock signals, and the phases of the gate clock signals GCK1 and GCK2 are shifted by 180 degrees. As power source voltages for operation, the gate high-level side power source voltage GVDD and the gate low-level side power source voltage GVSS are applied to the shift register 300.

Each unit circuit 3 includes an input terminal that receives the gate clock signal GCK1 or the gate clock signal GCK2 as an input clock signal CKA, an input terminal that receives the clear signal GCLR, an input terminal that receives a set signal S, an input terminal that receives a reset signal R, an input terminal that receives the gate high-level side power source voltage GVDD, an input terminal that receives a gate low-level side power source voltage GVSS, and an output terminal that outputs an output signal Q.

Signals applied to input terminals of the respective stages (respective unit circuits 3) of the shift register 300 are as follows. The gate clock signal GCK1 is applied as the input clock signal CKA to the unit circuits 3 in the odd-numbered stages, and the gate clock signal GCK2 is applied as the input clock signal CKA to the unit circuits 3 in the even-numbered stages. Regarding a unit circuit 3(*k*) at an arbitrary stage (k-th stage in this case), an output signal Q(k−1) output from a unit circuit 3(*k*−1) at a stage one stage before the arbitrary stage is applied as the set signal S, and an output signal Q(k+1) output from a unit circuit 3(*k*+1) at a stage one stage after the arbitrary stage is applied as the reset signal R. The gate start pulse signal GSP is applied as the set signal S to the unit circuit 3(1) at the first stage, and the clear signal GCLR is applied as the reset signal R to the unit circuit 3(*i*) at the i-th stage. The gate high-level side power source voltage GVDD, the gate low-level side power source voltage GVSS, and the clear signal GCLR are applied in common to all of the unit circuits 3(1) to 3(*i*).

The output signal Q is output from an output terminal (of each of the unit circuits 3) at each of the stages of the shift register 300. The output signal Q output from the arbitrary stage (k-th stage in this case) is applied to a gate bus line GLk in a k-th row as a scanning signal and is also applied to a unit circuit 3(*k*−1) at a stage one stage before the arbitrary stage as the reset signal R, and is applied to a unit circuit 3(*k*+1) at a stage one stage after the arbitrary stage as the set signal S.

In the above-described configuration, when a pulse of the gate start pulse signal GSP as the set signal S is applied to the unit circuit 3(1) at the first stage of the shift register 300, a shift pulse included in the output signal Q output from each unit circuit 3 is sequentially transferred from the unit circuit 3(1) at the first stage to the unit circuit 3(*i*) at the i-th stage based on the clock operations of the gate clock signals GCK1 and GCK2. Then, in response to the transfer of the shift pulses, the output signals Q output from the unit circuits 3 are sequentially set to be at a high level. Thereby, i scanning signals applied to i gate bus lines GL1 to GLi arranged in the display portion 20 are sequentially set to be at a high level (active). That is, i gate bus lines GL1 to GLi are sequentially set to be in a selected state.

1.3.2 Configuration of Unit Circuit

Figure 9:
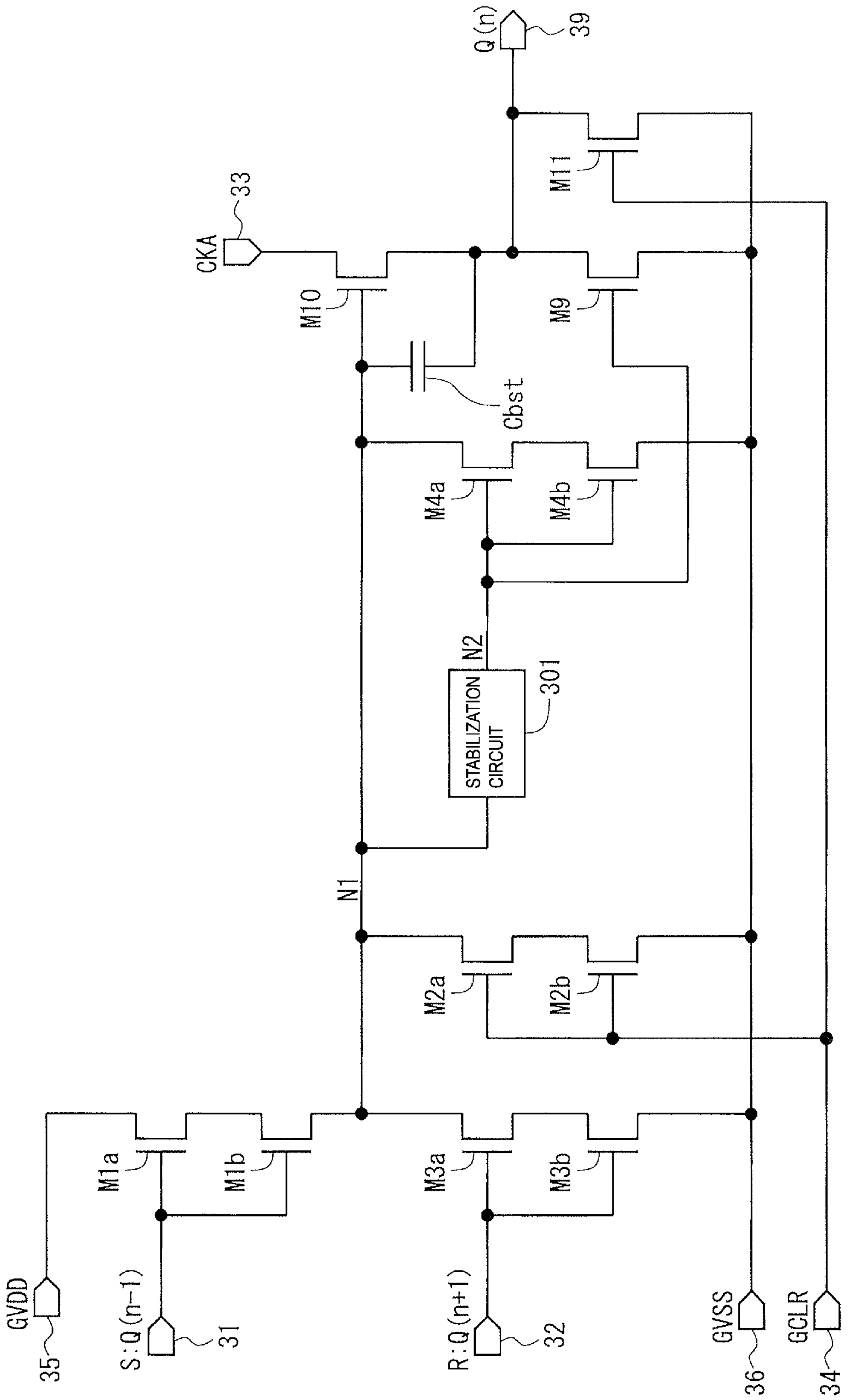
FIG. 9 is a circuit diagram illustrating a configuration example of a unit circuit in the first embodiment.

FIG. 9 is a circuit diagram illustrating a configuration example of the unit circuit 3. The unit circuit 3 illustrated in FIG. 9 is assumed to be a unit circuit 3(*n*) at an n-th stage. As illustrated in FIG. 9, the unit circuit 3 includes eleven thin film transistors M1*a*, M1*b*, M2*a*, M2*b*, M3*a*, M3*b*, M4*a*, M4*b*, M9, M10, and M11, one capacitor (capacitance element) Cbst, and a stabilization circuit 301. The unit circuit 3 includes six input terminals 31 to 36 and one output terminal 39. The set signal S which is an output signal Q(n−1) from a unit circuit 3(*n*−1) at a stage one stage before the arbitrary stage is applied to the input terminal 31. The reset signal R which is an output signal Q(n+1) from a unit circuit 3(*n*+1) at a stage one stage after the arbitrary stage is applied to the input terminal 32. The gate clock signal GCK1 or the gate clock signal GCK2 is applied to the input terminal 33 as the input clock signal CKA. The clear signal GCLR is applied to the input terminal 34. The gate high-level side power source voltage GVDD is applied to the input terminal 35. The gate low-level side power source voltage GVSS is applied to the input terminal 36. An output signal Q(*n*) is output from the output terminal 39. The output signal Q(*n*) is applied to the corresponding gate bus line GLn as a scanning signal, applied to a unit circuit 3(*n*−1) at a stage one stage before the arbitrary stage as the reset signal R, and applied to a unit circuit 3(*n*+1) at a stage one stage after the arbitrary stage as the set signal S.

Next, a connection relationship between the components in the unit circuit 3 will be described. Hereinafter, a gate terminal will be referred to as a "control terminal", one of two terminals functioning as a drain terminal and a source terminal will be referred to as a "first conduction terminal", and the other will be referred to as a "second conduction terminal". A second conduction terminal of the thin film transistor M1*b*, a first conduction terminal of the thin film transistor M2*a*, a first conduction terminal of the thin film transistor M3*a*, a first conduction terminal of the thin film transistor M4*a*, a control terminal of the thin film transistor M10, one end of the capacitor Cbst, and the stabilization circuit 301 are connected to each other via a first node N1. A control terminal of the thin film transistor M4*a*, a control terminal of the thin film transistor M4*b*, a control terminal of the thin film transistor M9, and the stabilization circuit 301 are connected to each other via a second node N2.

Regarding the thin film transistor M1*a*, a control terminal is connected to the input terminal 31, a first conduction terminal is connected to the input terminal 35, and a second conduction terminal is connected to a first conduction terminal of the thin film transistor M1*b*. Regarding the thin film transistor M1*b*, a control terminal is connected to the input terminal 31, a first conduction terminal is connected to a second conduction terminal of the thin film transistor M1*a*, and a second conduction terminal is connected to the first node N1. Regarding the thin film transistor M2*a*, a control terminal is connected to the input terminal 34, a first conduction terminal is connected to the first node N1, and a second conduction terminal is connected to a first conduction terminal of the thin film transistor M2*b*. Regarding the thin film transistor M2*b*, a control terminal is connected to the input terminal 34, a first conduction terminal is connected to a second conduction terminal of the thin film transistor M2*a*, and a second conduction terminal is connected to the input terminal 36. Regarding the thin film transistor M3*a*, a control terminal is connected to the input terminal 32, a first conduction terminal is connected to the first node N1, and a second conduction terminal is connected to a first conduction terminal of the thin film transistor M3*b*. Regarding the thin film transistor M3*b*, a control terminal is connected to the input terminal 32, a first conduction terminal is connected to a second conduction terminal of the thin film transistor M3*a*, and a second conduction terminal is connected to the input terminal 36. Regarding the thin film transistor M4*a*, a control terminal is connected to the second node N2, a first conduction terminal is connected to the first node N1, and a second conduction terminal is connected to a first conduction terminal of the thin film transistor M4*b*. Regarding the thin film transistor M4*b*, a control terminal is connected to the second node N2, a first conduction terminal is connected to a second conduction terminal of the thin film transistor M4*a*, and a second conduction terminal is connected to the input terminal 36. Regarding the thin film transistor M9, a control terminal is connected to the second node N2, a first conduction terminal is connected to the output terminal 39, and a second conduction terminal is connected to the input terminal 36. Regarding the thin film transistor M10, a control terminal is connected to the first node N1, a first conduction terminal is connected to the input terminal 33, and a second conduction terminal is connected to the output terminal 39. Regarding the thin film transistor M11, a control terminal is connected to the input terminal 34, a first conduction terminal is connected to the output terminal 39, and a second conduction terminal is connected to the input terminal 36. Regarding the capacitor Cbst, one end is connected to the first node N1, and the other end is connected to the output terminal 39.

Figure 10:
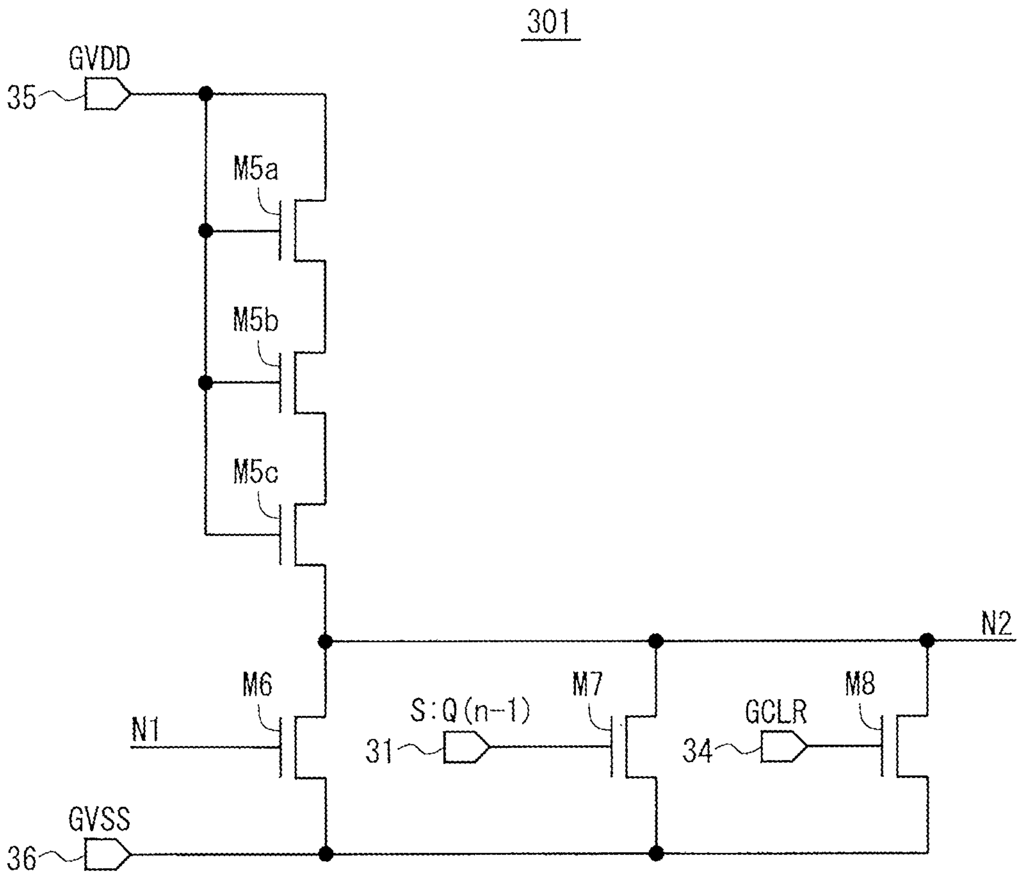
FIG. 10 is a circuit diagram illustrating a configuration example of a stabilization circuit in the first embodiment.

FIG. 10 is a circuit diagram illustrating a configuration example of the stabilization circuit 301. As illustrated in FIG. 10, the stabilization circuit 301 includes six thin film transistors M5*a*, M5*b*, M5*c*, M6, M7, and M8. Regarding the thin film transistor M5*a*, a control terminal and a first conduction terminal are connected to the input terminal 35, and a second conduction terminal is connected to a first conduction terminal of the thin film transistor M5*b*. Regarding the thin film transistor M5*b*, a control terminal is connected to the input terminal 35, a first conduction terminal is connected to a second conduction terminal of the thin film transistor M5*a*, and a second conduction terminal is connected to a first conduction terminal of the thin film transistor M5*c*. Regarding the thin film transistor M5*c*, a control terminal is connected to the input terminal 35, a first conduction terminal is connected to a second conduction terminal of the thin film transistor M5*b*, and a second conduction terminal is connected to the second node N2. Regarding the thin film transistor M6, a control terminal is connected to the first node N1, a first conduction terminal is connected to the second node N2, and a second conduction terminal is connected to the input terminal 36. Regarding the thin film transistor M7, a control terminal is connected to the input terminal 31, a first conduction terminal is connected to the second node N2, and a second conduction terminal is connected to the input terminal 36. Regarding the thin film transistor M8, a control terminal is connected to the input terminal 34, a first conduction terminal is connected to the second node N2, and a second conduction terminal is connected to the input terminal 36.

1.3.3 Operation of Unit Circuit

Figure 11:
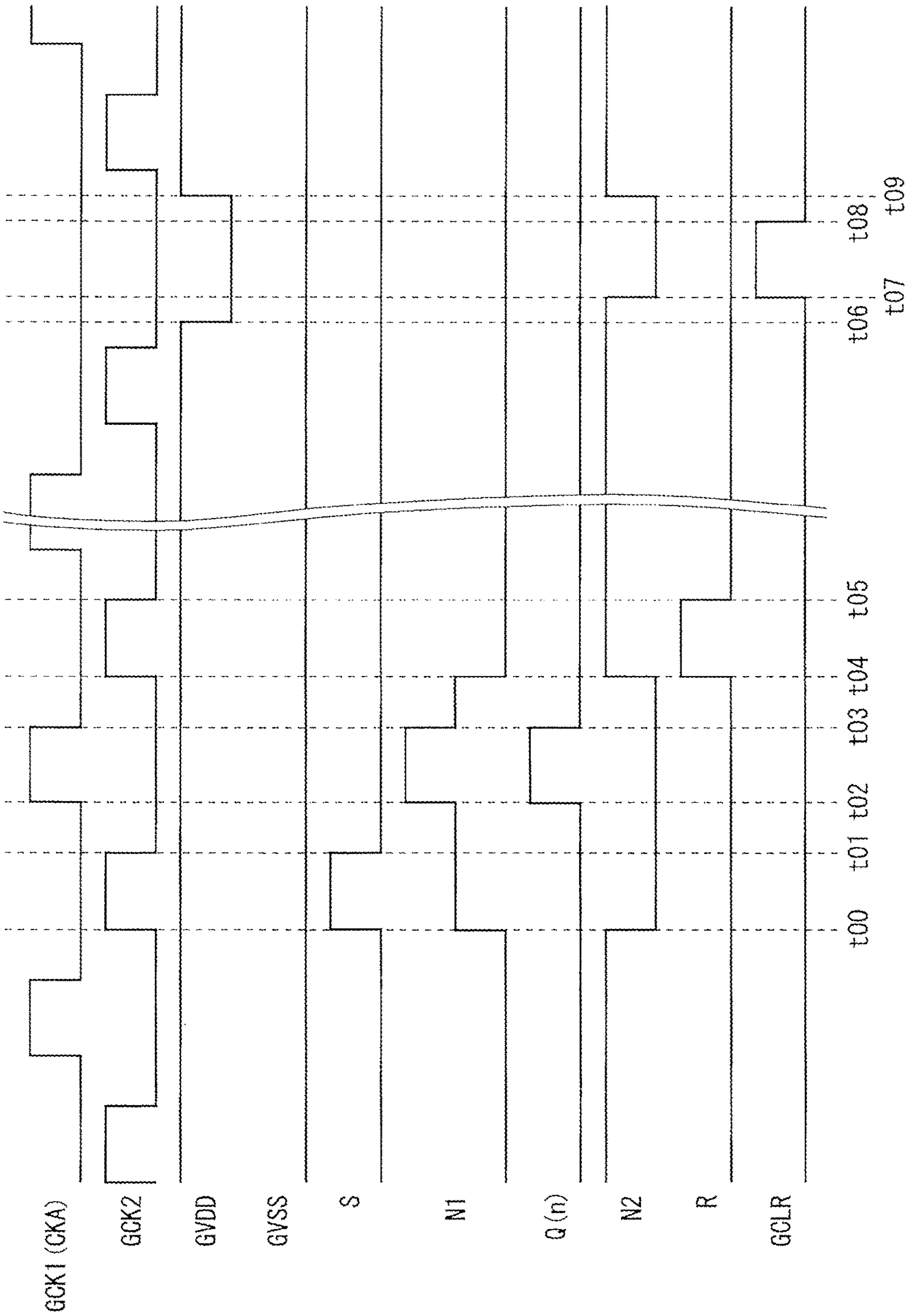
FIG. 11 is a signal waveform diagram illustrating an operation of the unit circuit in a period during which an operation mode is maintained in a normal mode in the first embodiment.

Next, the operation of the unit circuit 3(*n*) at the n-th stage in a period during which an operation mode is maintained in a normal mode will be described with reference to a signal waveform diagram illustrated in FIG. 11. At a point in time immediately before time t00, the set signal S is at a low level, the potential of the first node N1 is at a low level, the output signal Q(*n*) is at a low level, the potential of the second node N2 is at a high level, the reset signal R is at a low level, and the clear signal GCLR is at a low level.

At time t00, the set signal S changes from a low level to a high level. Thereby, the thin film transistors M1*a*, M1*b*, and M7 are set to be in an ON state. When the thin film transistors M1*a* and M1*b* are set to be in an ON state, the potential of the first node N1 rises, and the thin film transistors M6 and M10 are set to be in an ON state. When the thin film transistors M6 and M7 are set to be in an ON state, the potential of the second node N2 changes from a high level to a low level. Since the input clock signal CKA is at a low level in a period from time t00 to time t02, the output signal Q(*n*) is maintained at a low level even when the thin film transistor M10 is set to be in an ON state. At time t01, the set signal S changes from a high level to a low level. Thereby, the thin film transistors M1*a*, M1*b*, and M7 are set to be in an OFF state.

At time t02, the input clock signal CKA changes from a low level to a high level. At this time, the thin film transistor M10 is in an ON state, and thus the potential of the output terminal 39 rises along with a rise in the potential of the input terminal 33. Here, since the capacitor Cbst is provided between the first node N1 and the output terminal 39 as illustrated in FIG. 9, the potential of the first node N1 also rises along with a rise in the potential of the output terminal 39 (the first node N1 is set to be in a boost state). As a result, a large voltage is applied to the control terminal of the thin film transistor M10, and the potential of the output signal Q(*n*) rises up to a level sufficient to cause the gate bus line GLn connected to the output terminal 39 to be in a select state.

At time t03, the input clock signal CKA changes from a high level to a low level. Thereby, the potential of the output terminal 39 is lowered along with a decrease in the potential of the input terminal 33. That is, the potential of the output signal Q(*n*) changes from a high level to a low level. The potential of the first node N1 is lowered via the capacitor Cbst.

At time t04, the reset signal R changes from a low level to a high level. Thereby, the thin film transistors M3*a* and M3*b* are set to be in an ON state, and the potential of the first node N1 is set to be at a low level. When the potential of the first node N1 is set to be at a low level, the thin film transistors M6 and M10 are set to be in an OFF state. At this time, since the thin film transistors M5*a*, M5*b*, and M5*c* are in an ON state, the potential of the second node N2 changes from a low level to a high level when the thin film transistor M6 is set to be in an OFF state. At time t05, the reset signal R changes from a high level to a low level. Thereby, the thin film transistors M3*a* and M3*b* are set to be in an OFF state.

At time t06, the potential of the gate high-level side power source voltage GVDD is lowered. Thereby, the thin film transistors M5*a*, M5*b*, and M5*c* are set to be in an OFF state. Thereafter, at time t07, the clear signal GCLR changes from a low level to a high level. Thereby, the thin film transistors M2*a*, M2*b*, M8, and M11 are set to be in an ON state. When the thin film transistors M2*a* and M2*b* are set to be in an ON state, the potential of the first node N1 is brought into a completely low level. When the thin film transistor M8 is set to be in an ON state, the potential of the second node N2 changes from a high level to a low level. When the thin film transistor M11 is set to be in an ON state, the potential of the output signal Q(*n*) is brought into a completely low level.

At time t08, the clear signal GCLR changes from a high level to a low level. Thereby, the thin film transistors M2*a*, M2*b*, M8, and M11 are set to be in an OFF state. Thereafter, at time t09, the potential of the gate high-level side power source voltage GVDD rises. Thereby, the thin film transistors M5*a*, M5*b*, and M5*c* are set to be in an ON state, and the potential of the second node N2 changes from a low level to a high level.

Incidentally, the thin film transistors M4*a*, M4*b*, and M9 are in an ON state in a period during which the potential of the second node N2 is maintained at a high level. For this reason, the potential of the first node N1 and the potential of the output signal Q(*n*) (the potential of the output terminal 39) are reliably maintained at a low level. Thus, the operation of the gate driver 30 is stabilized.

When the above-described operations are performed in each unit circuit 3, i gate bus lines GL(1) to GL(i) provided in the liquid crystal display device are sequentially set to be in a select state, and video signals are sequentially written to the liquid crystal capacitance 23. Thereby, an image based on the image signal DA transmitted from the outside is displayed in the display portion 20.

1.4 Source Driver

Figure 12:
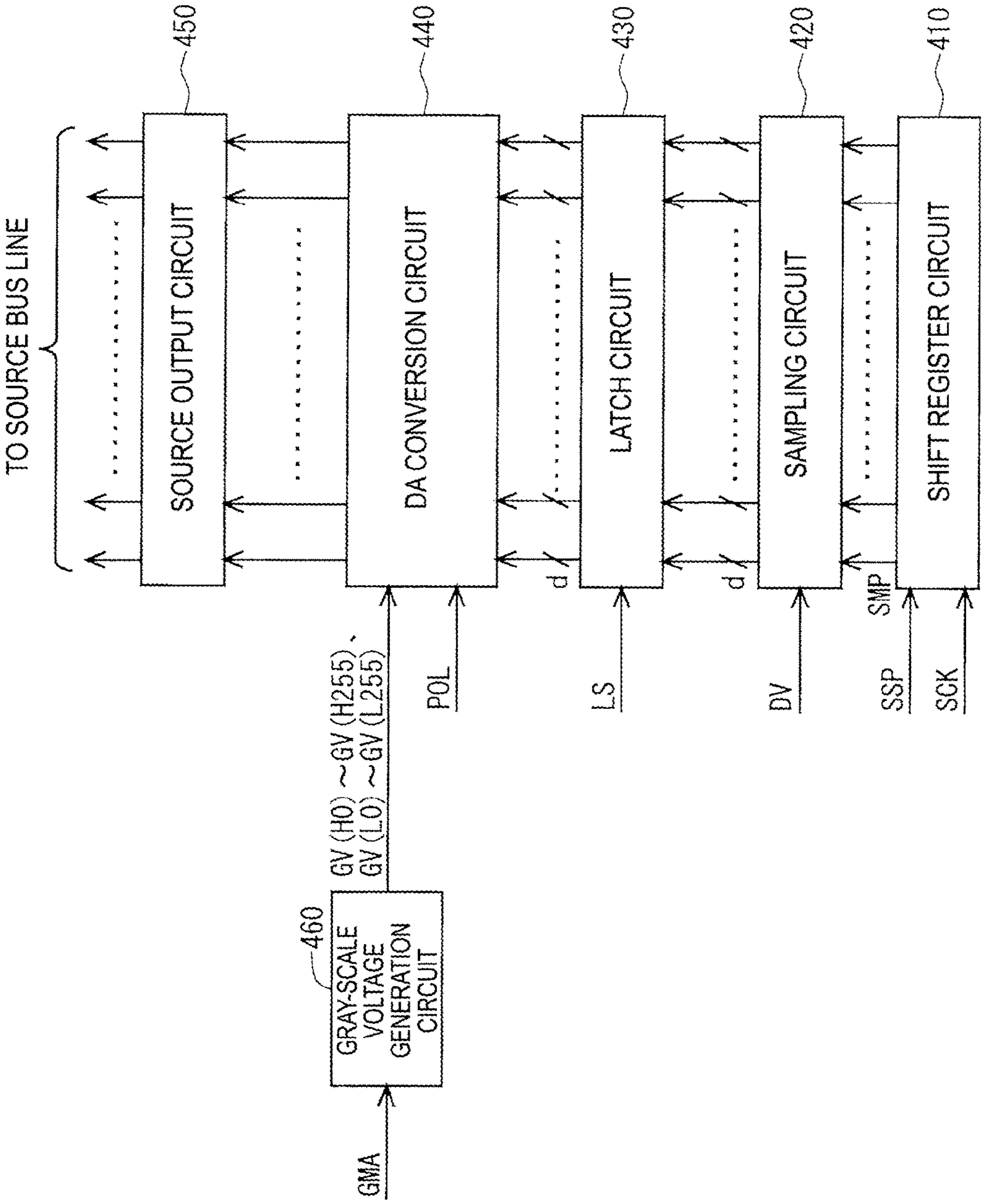
FIG. 12 is a block diagram illustrating a configuration example of a source driver in the first embodiment.

FIG. 12 is a block diagram illustrating a configuration example of the source driver 40. As illustrated in FIG. 12, the source driver 40 includes a shift register circuit 410, a sampling circuit 420, a latch circuit 430, a DA conversion circuit 440, a source output circuit 450, and a gray-scale voltage generation circuit 460.

A source start pulse signal SSP and a source clock signal SCK are input to the shift register circuit 410. The shift register circuit 410 sequentially transfers pulses included in the source start pulse signal SSP from an input end to an output end based on the source clock signal SCK. Sampling pulses SMP corresponding to the source bus lines SL are sequentially output from the shift register circuit 410 in response to the transfer of the pulses, and the sampling pulses SMP are sequentially input to the sampling circuit 420.

The sampling circuit 420 samples a digital video signal DV at the timing of the sampling pulse SMP output from the shift register circuit 410 and outputs the digital video signal DV as an internal image signal d. The latch circuit 430 takes in the internal image signal d output from the sampling circuit 420 at the timing of the pulse of the latch strobe signal LS and outputs the internal image signal d.

The gray-scale voltage generation circuit 460 generates 256 positive gray-scale voltages GV(H0) to GV(H255) and 256 negative gray-scale voltages GV(L0) to GV(L255) from the gamma power source voltage GMA supplied from the power source IC 51, and supplies the gray-scale voltages to the DA conversion circuit 440.

The DA conversion circuit 440 is constituted by a plurality of DA converters corresponding one-to-one to the plurality of source bus lines SL connected to the source output circuit 450. The 256 gray-scale voltages GV(H0) to GV(H255) for a positive polarity and the 256 gray-scale voltages GV(L0) to GV(L255) for a negative polarity are supplied to the DA conversion circuit 440 from the gray-scale voltage generation circuit 460. Each of the DA converter selects one of the gray-scale voltages GV based on a polarity control signal POL and the internal image signal d output from the latch circuit 430, and outputs the selected gray-scale voltage GV.

The source output circuit 450 performs impedance conversion on the gray-scale voltage GV output from each of the DA converters constituting the DA conversion circuit 440, and outputs the converted gray-scale voltage GV to each of the source bus lines SL as a driving video signal.

1.5 Driving Method

A method of driving the liquid crystal display device according to the present embodiment will be described. With respect to potentials (voltage levels) of various signals and the like, values shown below are merely examples, and the disclosure is not limited thereto.

1.5.1 Operation of Liquid Crystal Display Device in Normal Mode Period

Figure 13:
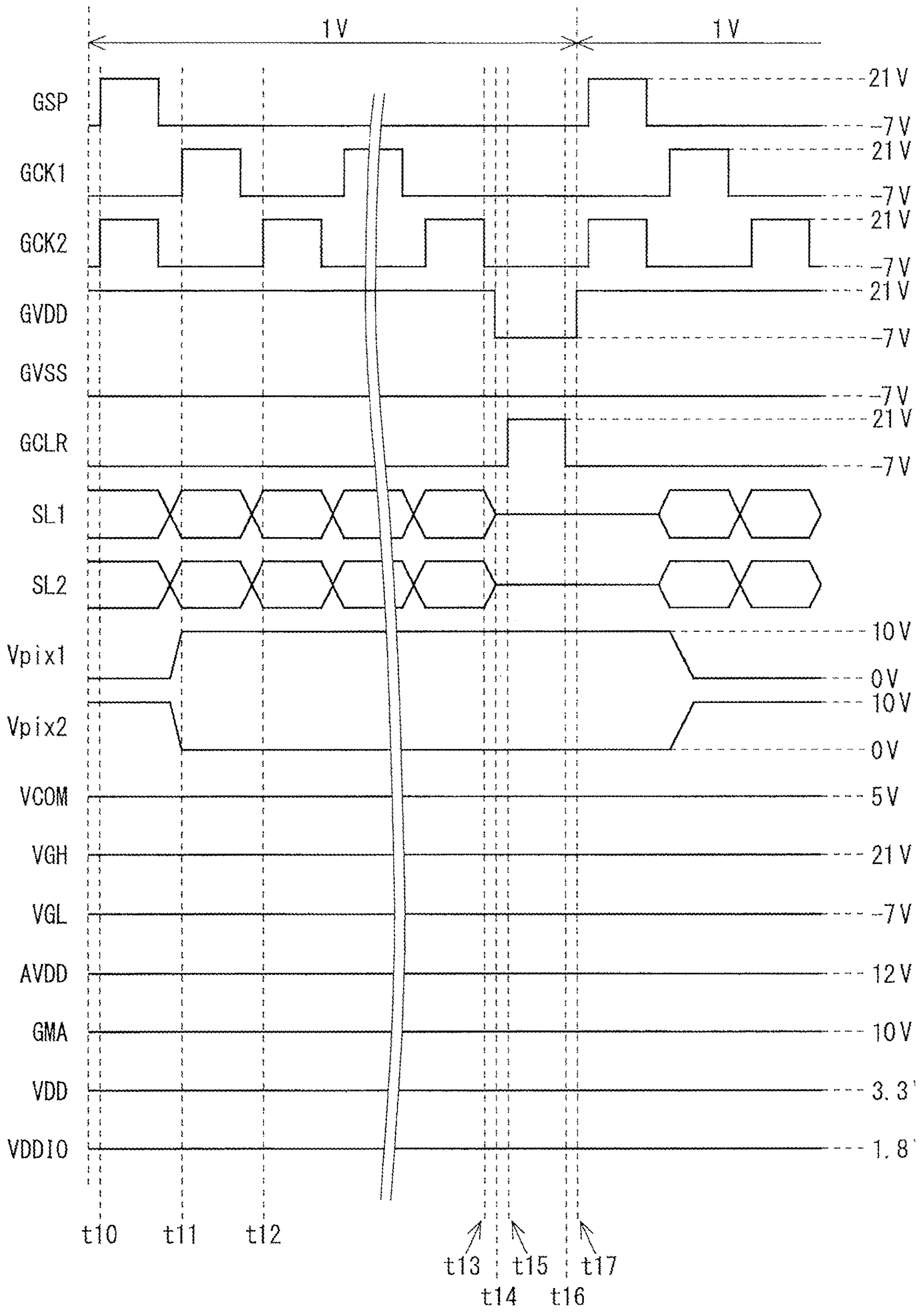
FIG. 13 is a signal waveform diagram illustrating an operation of the liquid crystal display device during a normal mode period in the first embodiment.

FIG. 13 is a signal waveform diagram in a normal mode period. In FIG. 13, Vpix1 is the potential (pixel potential) of the pixel electrode 22 included in the pixel forming portion 200 in the first row and the first column, and Vpix2 is the potential (pixel potential) of the pixel electrode 22 included in the pixel forming portion 200 in the first row and the second column (the same applies to FIGS. 1, 14, 25, 26, and 27). As illustrated in FIG. 13, the potential of the gate low-level side power source voltage GVSS is maintained at −7 V, the potential of the common electrode drive voltage VCOM is maintained at 5 V, the potential of the gate high power source voltage VGH is maintained at 21 V, the potential of the gate low power source voltage VGL is maintained at −7 V, the potential of the source power source voltage AVDD is maintained at 12 V, the potential of the gamma power source voltage GMA is maintained at 10 V, the potential of the logic power source voltage VDD is maintained at 3.3 V, and the potential of the input/output power source voltage VDDIO is maintained at 1.8 V. In this manner, in a period during which an operation mode is maintained in a normal mode, the potential of the gate low-level side power source voltage GVSS, the potential of the common electrode drive voltage VCOM, the potential of the gate high power source voltage VGH, the potential of the gate low power source voltage VGL, the potential of the source power source voltage AVDD, the potential of the gamma power source voltage GMA, the potential of the logic power source voltage VDD, and the potential of the input/output power source voltage VDDIO are maintained at constant values. The potential of the gate high-level side power source voltage GVDD is maintained at 21 V in most of the period.

When the pulse of the gate start pulse signal GSP is generated at time t10 and then the gate clock signal GCK1 changes from a low level to a high level at time t11, the gate bus line GL1 in the first row is set to be in a select state, and a driving video signal is applied to the pixel electrodes 22 included in the pixel forming portions 200 in the first row. Thereby, the pixel potential Vpix1 of the pixel forming portion 200 in the first row and the first column changes from 0 V to 10 V, and the pixel potential Vpix2 of the pixel forming portion 200 in the first row and the second column changes, for example, from 10 V to 0 V. In this manner, in the pixel forming portions 200 in the odd-numbered columns of the first row, a driving video signal is written to the liquid crystal capacitance 23 so that a liquid crystal application voltage has a positive polarity, and in the pixel forming portions 200 in the even-numbered columns of the first row, a driving video signal is written to the liquid crystal capacitance 23 so that a liquid crystal application voltage has a negative polarity.

When the gate clock signal GCK2 changes from a low level to a high level at time t12, the gate bus line GL2 in the second row is set to be in a select state, and a driving video signal is applied to the pixel electrodes 22 included in the pixel forming portions 200 in the second row. Thereby, the driving video signal is written to the liquid crystal capacitances 23 in the pixel forming portions 200 in the second row.

When the writing of the driving video signal to the liquid crystal capacitances 23 in the pixel forming portions 200 in the i-th row is completed at time t13, and then time t14 arrives, the potential of the gate high-level side power source voltage GVDD changes from 21 V to −7 V. When time t15 arrives in a state where the potential of the gate high-level side power source voltage GVDD is set to −7 V, the clear signal GCLR changes from a low level to a high level. Thereby, in all of the unit circuits 3 (see FIGS. 9 and 10) constituting the shift register 300 in the gate driver 30, the thin film transistors M2*a*, M2*b*, M8, and M11 are set to be in an ON state. As a result, in all of the unit circuits 3, the potential of the first node N1 and the potential of the output signal Q are brought into a completely low level, and the potential of the second node N2 changes from a high level to a low level. In this manner, the state of the gate driver 30 is initialized.

At time t16, the clear signal GCLR changes from a high level to a low level. Then, at time t17, the potential of the gate high-level side power source voltage GVDD changes from −7 V to 21 V.

When an operation mode is maintained in a normal mode, the above-described operation is repeated, and a display image is updated in each frame period.

1.5.2 Operation of Liquid Crystal Display Device when Operation Mode Transitions Next, the operation of the liquid crystal display device when an operation mode transitions will be described. A first transition step is realized by an operation in a first transition period, and a second transition step is realized by an operation in a second transition period.

1.5.2.1 Transition from Normal Mode to SP Mode

Figure 1:
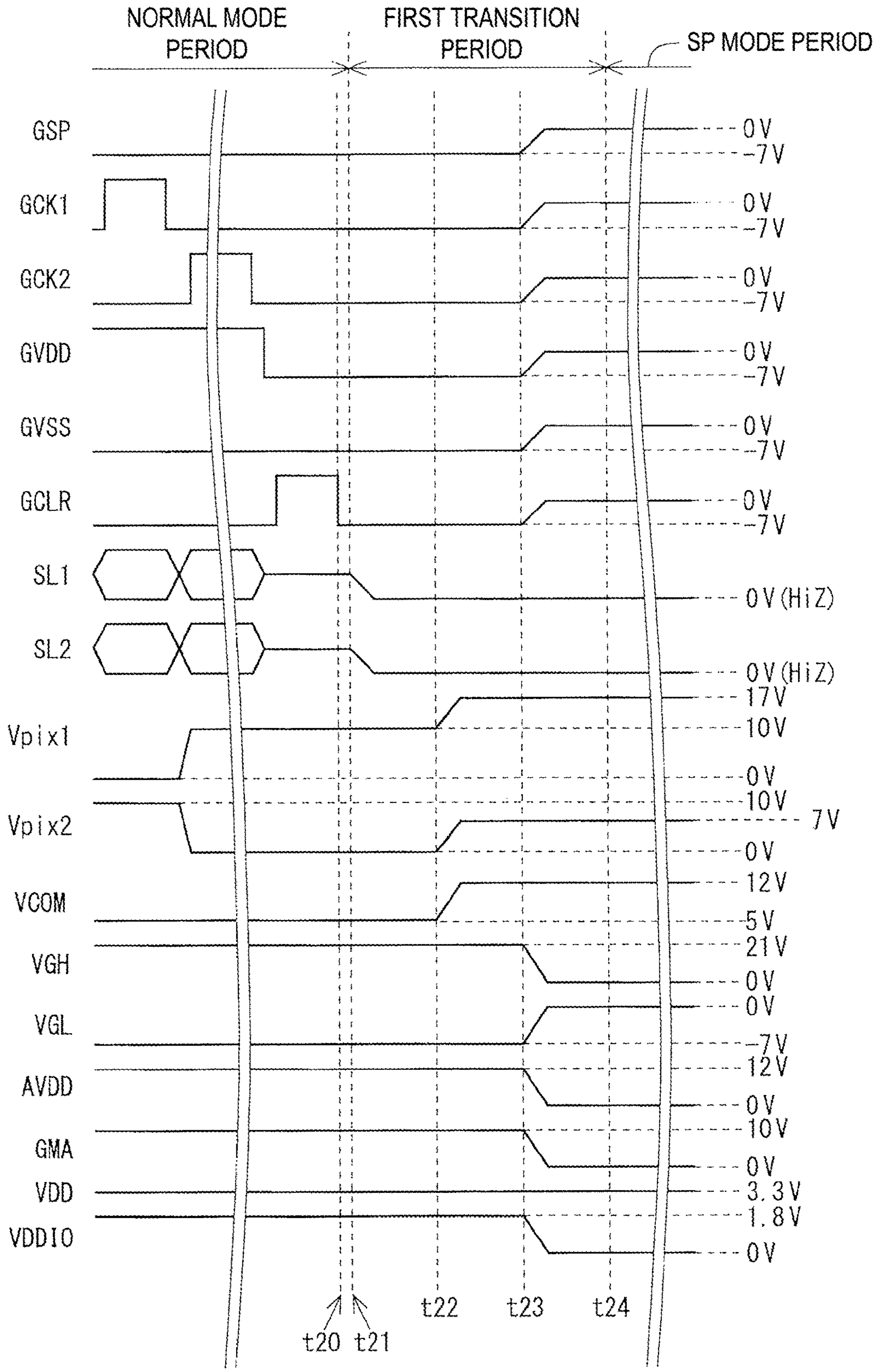
FIG. 1 is a signal waveform diagram illustrating an operation of a liquid crystal display device during a first transition period during which an operation mode transitions from a normal mode to an SP mode in a first embodiment.

FIG. 1 is a signal waveform diagram in a first transition period. After the clear signal GCLR changes from a high level to a low level at time t20, the first transition period starts at time t21. Immediately before time t21, the potential of the gate start pulse signal GSP is set to −7 V, the potential of the gate clock signal GCK1 is set to −7 V, the potential of the gate clock signal GCK2 is set to −7 V, the potential of the gate high-level side power source voltage GVDD is set to −7 V, the potential of the gate low-level side power source voltage GVSS is set to −7 V, the potential of the clear signal GCLR is set to −7 V, the pixel potential Vpix1 in the pixel forming portion 200 in the first row and the first column is set to 10 V, the pixel potential Vpix2 in the pixel forming portion 200 in the first row and the second column is set to 0 V, the potential of the common electrode drive voltage VCOM is set to 5 V, the potential of the gate high power source voltage VGH is set to 21 V, the potential of the gate low power source voltage VGL is set to −7 V, the potential of the source power source voltage AVDD is set to 12 V, the potential of the gamma power source voltage GMA is set to 10 V, the potential of the logic power source voltage VDD is set to 3.3 V, and the potential of the input/output power source voltage VDDIO is set to 1.8 V. The potential of each source bus line SL is, for example, an intermediate potential between the maximum potential and the minimum potential.

At time t21, all of the source bus lines SL1 to SLj are discharged. Thereby, the potentials of all of the source bus lines SL1 to SLj are set to 0 V. In FIG. 1, changes in potential are shown only for the source bus lines SL1 and SL2 among the source bus lines SL1 to SLj. Then, all of the source bus lines SL1 to SLj are set to be in a high impedance state. Since the potential of the common electrode drive voltage VCOM is maintained at 5 V in a period from time t21 to time t22, the pixel potential Vpix1 is maintained at 10 V and the pixel potential Vpix2 is maintained at 0 V.

At time t22, the VCOM generation unit 517 changes the potential of the common electrode drive voltage VCOM from 5 V to 12 V. At this time, in each pixel forming portion 200, the pixel transistor 21 is maintained in an OFF state. For this reason, when the potential of the common electrode drive voltage VCOM rises from 5 V to 12 V, a pixel potential also rises in each pixel forming portion 200. For example, the pixel potential Vpix1 rises from 10 V to 17 V, and the pixel potential Vpix2 rises from 0 V to 7 V. Since a liquid crystal application voltage does not change, a display image does not change.

At time t23, the generation of the gate high power source voltage VGH, the gate low power source voltage VGL, the source power source voltage AVDD, the gamma power source voltage GMA, and the input/output power source voltage VDDIO is stopped in the power source IC 51. Thereby, the potential of the gate high power source voltage VGH, the potential of the gate low power source voltage VGL, the potential of the source power source voltage AVDD, the potential of the gamma power source voltage GMA, and the potential of the input/output power source voltage VDDIO are set to 0 V. The potential of the logic power source voltage VDD is maintained at 3.3 V. When the potential of the gate high power source voltage VGH and the potential of the gate low power source voltage VGL are set to 0 V, the power source of the level shifter IC 53 that generates the gate control signal GCTL is set to be in an OFF state. As a result, the potential of the gate start pulse signal GSP, the potential of the gate clock signal GCK1, the potential of the gate clock signal GCK2, the potential of the gate high-level side power source voltage GVDD, the potential of the gate low-level side power source voltage GVSS, and the potential of the clear signal GCLR are set to 0 V. In this manner, in a pause period of an SP mode period, the potential of the gate control signal GCTL for controlling the operation of the gate driver 30 is maintained at 0 V.

Incidentally, when the generation of the gate high power source voltage VGH and the gate low power source voltage VGL is stopped at time t23, the potential of the gate start pulse signal GSP, the potential of the gate clock signal GCK1, the potential of the gate clock signal GCK2, the potential of the gate high-level side power source voltage GVDD, the potential of the gate low-level side power source voltage GVSS, and the potential of the clear signal GCLR rise from −7 V to 0 V. Accordingly, the potential of each gate bus line GL also rises from −7 V to 0 V (the gate driver 30 changes the potential of each gate bus line GL from −7 V to 0 V). That is, the potential of each gate bus line GL rises by 7 V. In consideration of this, the VCOM generation unit 517 increases the potential of the common electrode drive voltage VCOM by 7 V at time t22 so that a leakage current flowing through the pixel transistor 21 is not generated during the pause period of the SP mode period. In this manner, in the present embodiment, a variation range of the potential of the common electrode drive voltage VCOM in the first transition period is equal to a variation range of the potential of i gate bus lines GL1 to GLi in the first transition period.

As described above, the normal mode period transitions to the SP mode period. As described above, a display image does not change in the first transition period, and thus the display image at the end point of the normal mode period immediately before the first transition period remains displayed as is also in the SP mode period.

As described above, all of the source bus lines SL1 to SLj are set to be in a high impedance state at time t21, and the generation of the source power source voltage AVDD and the gamma power source voltage GMA is stopped at time t23. In this manner, in the pause period of the SP mode period, all of the source bus lines SL1 to SLj are maintained in a high impedance state, and the power source of the source driver 40 is maintained in an OFF state.

As described above, the VCOM generation unit 517 changes the potential of the common electrode drive voltage VCOM from 5 V to 12 V at time t22. In this regard, 5 V is equivalent to a potential of a first level, and 12 V is equivalent to a potential of a second level. At time t23, the gate driver 30 changes the potential of each gate bus line GL from −7 V to 0 V. In this regard, −7 V is equivalent to a potential of a predetermined off level.

1.5.2.2 Transition from SP Mode to Normal Mode

Figure 14:
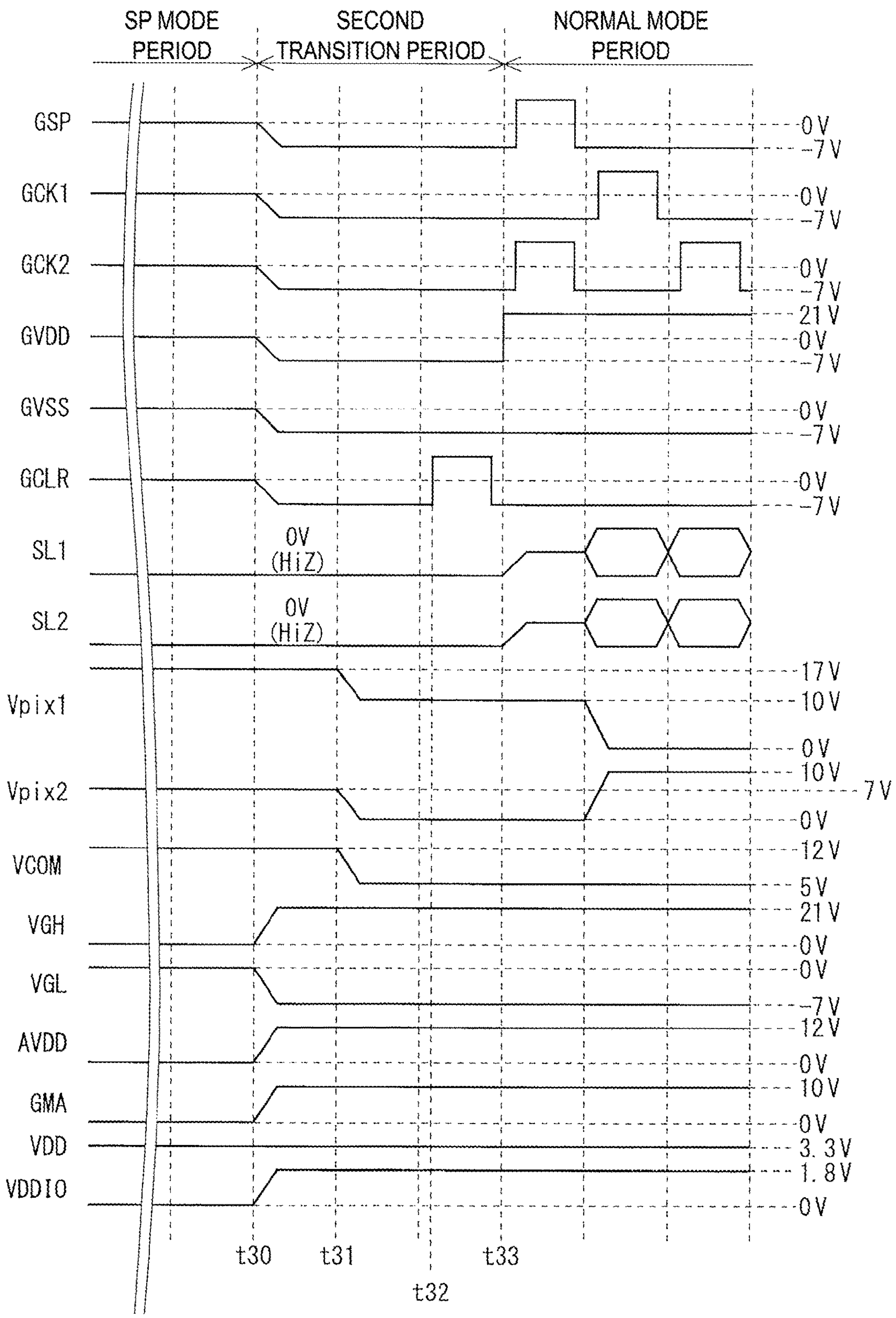
FIG. 14 is a signal waveform diagram illustrating an operation of the liquid crystal display device during a second transition period during which an operation mode transitions from an SP mode to a normal mode in the first embodiment.

FIG. 14 is a signal waveform diagram in the second transition period. At time t30, the generation of the gate high power source voltage VGH, the gate low power source voltage VGL, the source power source voltage AVDD, the gamma power source voltage GMA, and the input/output power source voltage VDDIO is restarted in the power source IC 51. Thereby, the potential of the gate high power source voltage VGH changes from 0 V to 21 V, the potential of the gate low power source voltage VGL changes from 0 V to −7 V, the potential of the source power source voltage AVDD changes from 0 V to 12 V, the potential of the gamma power source voltage GMA changes from 0 V to 10 V, and the potential of the input/output power source voltage VDDIO changes from 0 V to 1.8 V. When the generation of the gate high power source voltage VGH and the gate low power source voltage VGL is restarted, the potential of the gate start pulse signal GSP, the potential of the gate clock signal GCK1, the potential of the gate clock signal GCK2, the potential of the gate high-level side power source voltage GVDD, the potential of the gate low-level side power source voltage GVSS, and the potential of the clear signal GCLR are lowered from 0 V to −7 V. As described above, the potential of each gate bus line GL is lowered from 0 V to −7 V (the gate driver 30 changes the potential of each gate bus line GL from 0 V to −7 V).

At time t31, the VCOM generation unit 517 changes the potential of the common electrode drive voltage VCOM from 12 V to 5 V. At this time, in each pixel forming portion 200, the pixel transistor 21 is maintained in an OFF state. For this reason, when the potential of the common electrode drive voltage VCOM is lowered from 12 V to 5 V, a pixel potential is also lowered in each pixel forming portion 200. For example, the pixel potential Vpix1 is lowered from 17 V to 10 V, and the pixel potential Vpix2 is lowered from 7 V to 0 V. Since a liquid crystal application voltage does not change, a display image does not change.

At time t32, the clear signal GCLR changes from a low level to a high level. Thereby, in all of the unit circuits 3 (see FIGS. 9 and 10) constituting the shift register 300 in the gate driver 30, the thin film transistors M2*a*, M2*b*, M8, and M11 are set to be in an ON state. As a result, in all of the unit circuits 3, the potential of the first node N1 and the potential of the output signal Q are brought into a completely low level, and the potential of the second node N2 changes from a high level to a low level. In this manner, the state of the gate driver 30 is initialized.

At time t33, the potential of the gate high-level side power source voltage GVDD output from the level shifter IC 53 changes from −7 V to 21 V under the control of the timing control unit 524. The source bus lines SL are electrically connected to the source driver 40, and the potentials of the source bus lines SL become equal to a potential (for example, an intermediate potential between the maximum potential and the minimum potential) immediately before the start time (time t21 in FIG. 1) of the first transition period.

As described above, the SP mode period transitions to the normal mode period. After the pulse of the gate start pulse signal GSP is generated, a driving video signal is written to the liquid crystal capacitances 23 included in the pixel forming portions 200 of each row based on the clock operations of the gate clock signals GCK1 and GCK2. That is, the display image is updated.

1.6 Effects

Figure 15:
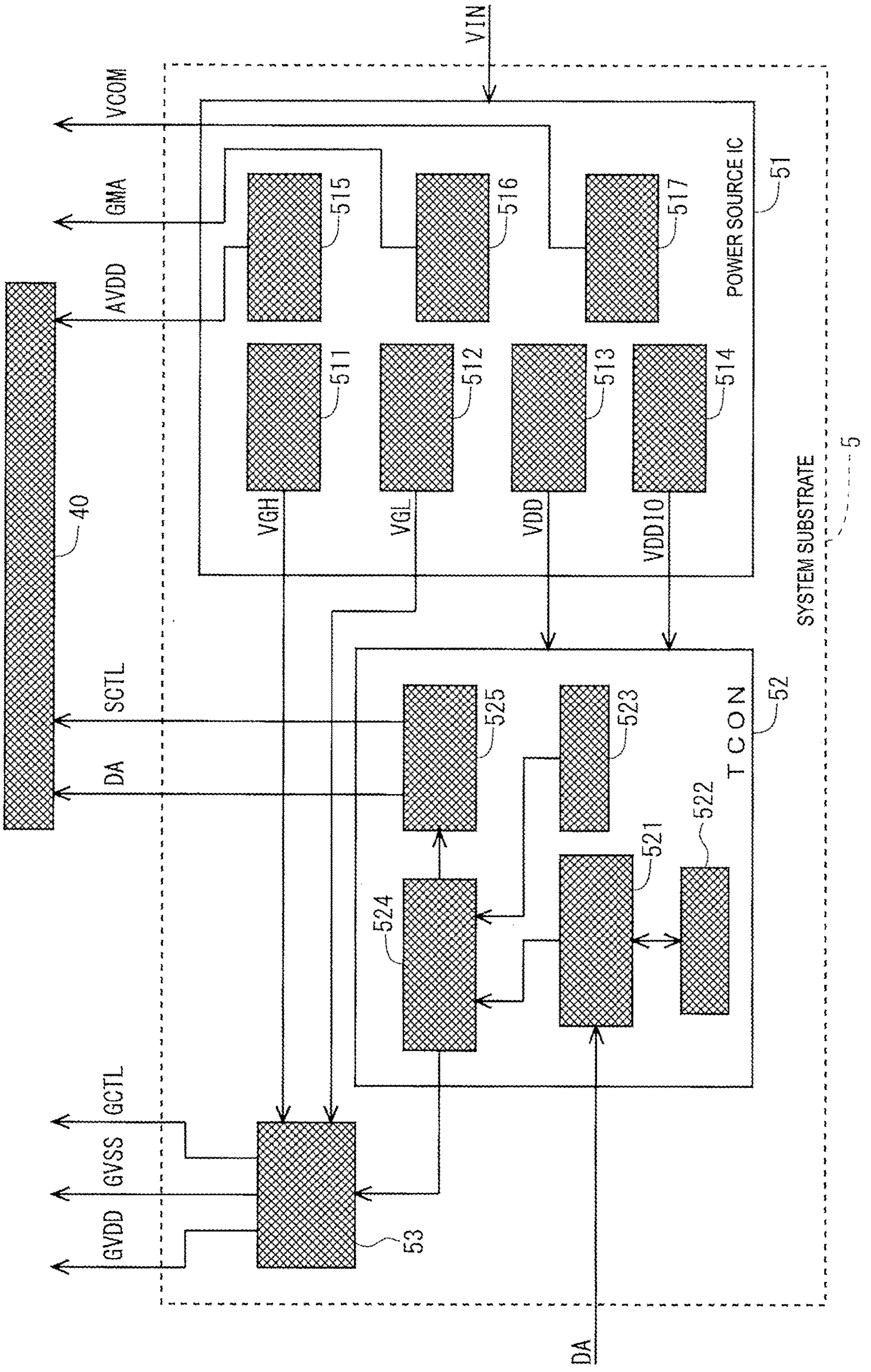
FIG. 15 is a diagram schematically illustrating the state of each component in a normal mode period in the first embodiment.
Figure 16:
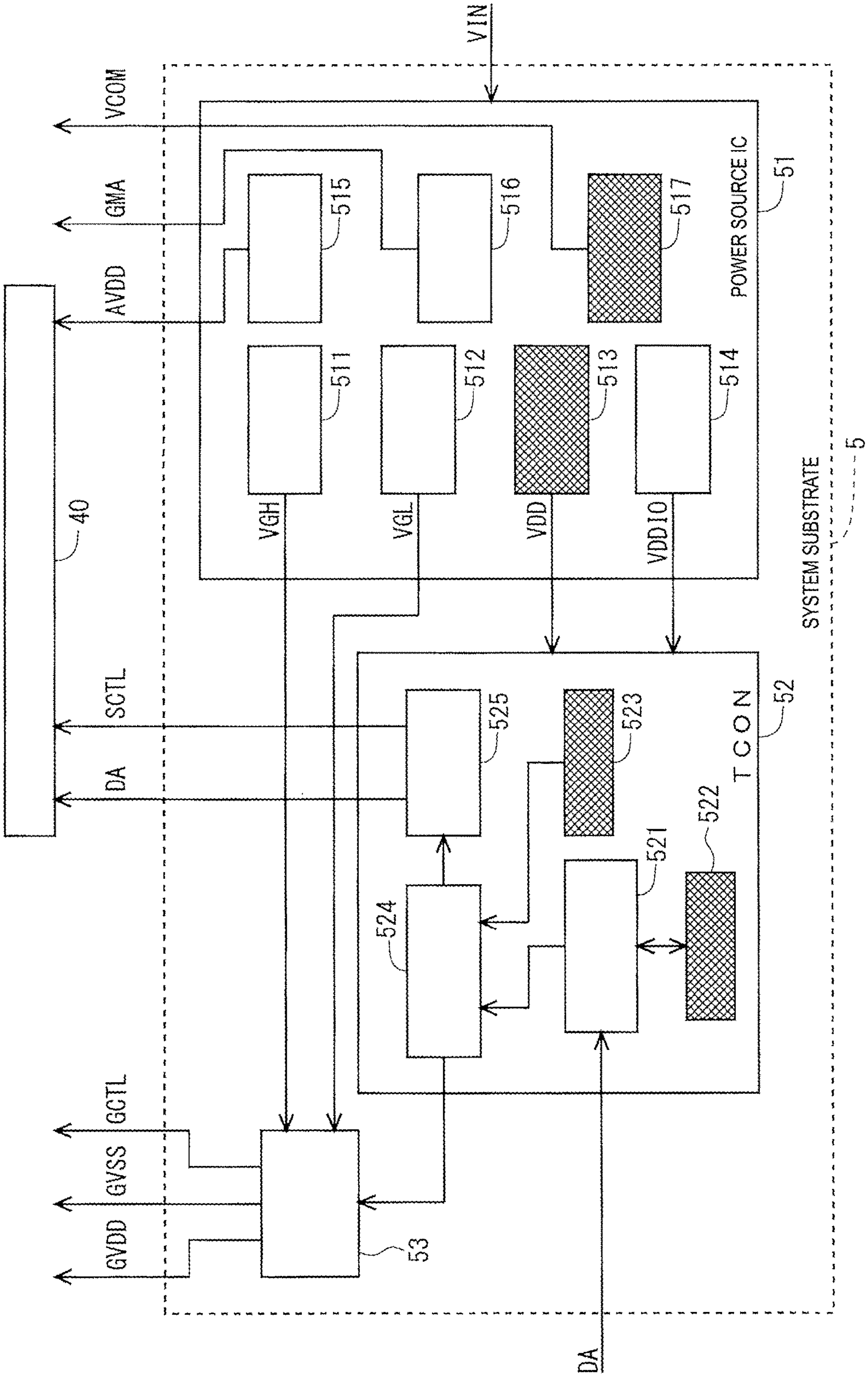
FIG. 16 is a diagram schematically illustrating the state of each component in a pause period of an SP mode period in the first embodiment.

According to the present embodiment, an operation mode of the liquid crystal display device can be switched between a normal mode in which a drive frequency is set to 60 Hz and an SP mode in which a drive frequency is set to 0.01 Hz. Here, with respect to the components provided in the source driver 40 and the system substrate 5, a difference between a state in a normal mode period and a state in a pause period of an SP mode period will be described with reference to FIGS. 15 and 16. FIG. 15 schematically illustrates a state in the normal mode period, and FIG. 16 schematically illustrates a state in the pause period of the SP mode period. Components in operation are shaded. In the normal mode period, all components operate as illustrated in FIG. 15. On the other hand, in the pause period of the SP mode period, the VDD generation unit 513, the VCOM generation unit 517, the RAM 522, and the oscillator 523 operate as illustrated in FIG. 16, but operations of the other components are paused.

Figure 17:
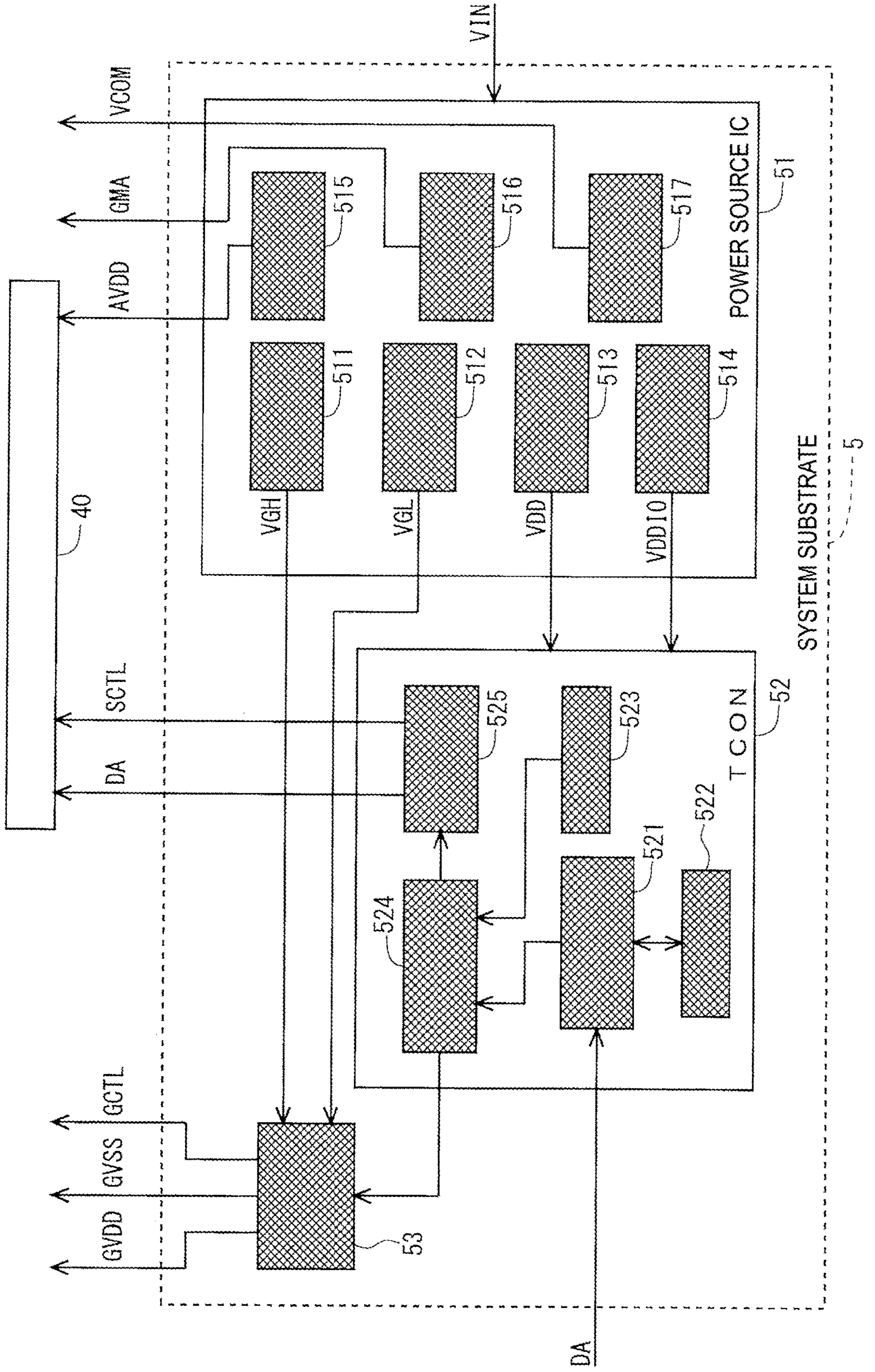
FIG. 17 is a diagram schematically illustrating the state of each component in a pause period in a liquid crystal display device adopting pause driving of the related art.

Incidentally, in a liquid crystal display device adopting pause driving of the related art, each component in the power source IC 51 is not set to be in a pause state but set to be in a standby state so that an operation mode is rapidly switched to the normal mode in response to an action from the outside during the pause period. That is, as illustrated in FIG. 17, only the source driver 40 is set to be in a pause state. On the other hand, in the present embodiment, the VGH generation unit 511, the VGL generation unit 512, the VDDIO generation unit 514, the AVDD generation unit 515, and the GMA generation unit 516 are set to be in a pause state in the pause period of the SP mode period with respect to the components in the power source IC 51, and the input/output circuit 521, the timing control unit 524, and the source output interface (I/F) 525 are set to be in a pause state, and the level shifter IC 53 and the source drivers 40 are set to be in a pause state with respect to the components in the ICON 52.

FIG. 18 illustrates a difference in an operation state of each component among a normal mode, a low frequency mode of the related art (pause period), and an SP mode (pause period). In a period during which an operation mode is set to be a normal mode, all of the source driver 40, the gate driver 30, the power source (here, the power source means the VGH generation unit 511, the VGL generation unit 512, the AVDD generation unit 515, the GMA generation unit 516, and the VDDIO generation unit 514), and the ICON 52 are driven. In a pause period of a period during which an operation mode is set to be a low frequency mode (low frequency mode of the related art) in the liquid crystal display device adopting pause driving of the related art, only the source driver 40 is set to be in a pause state, and the gate driver 30, the power source, and the ICON 52 are driven. In a pause period of the period during which the operation mode is set to be the SP mode, the source driver 40, the gate driver 30, and the power source are set to be in a pause state, and a driving operation of the ICON 52 is minimized.

Figure 19:
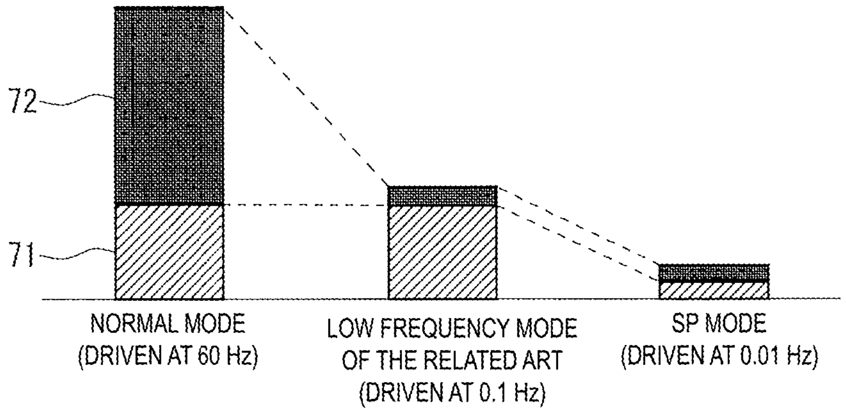
FIG. 19 is a diagram schematically illustrating a difference in power consumption among a normal mode, a low frequency mode of the related art, and an SP mode in the first embodiment.

As described above, FIG. 19 schematically illustrates a difference in power consumption among a normal mode, a low frequency mode of the related art, and an SP mode. In FIG. 19, a shaded portion denoted by reference numeral 71 indicates a direct current (DC) component of power consumption, and a shaded portion denoted by reference numeral 72 indicates an alternating current (AC) component of power consumption. First, the normal mode and the low frequency mode of the related art are compared. Although the AC component is greatly reduced in the low frequency mode of the related art as compared with the normal mode, the DC component is the same in the low frequency mode of the related art and the normal mode. Next, the normal mode and the SP mode are compared. The AC component is greatly reduced in the SP mode as compared with the normal mode. The DC component is also greatly reduced in the SP mode as compared with the normal mode. As described above, according to the SP mode, power consumption is greatly reduced as compared with the low frequency mode of the related art.

Figure 20:
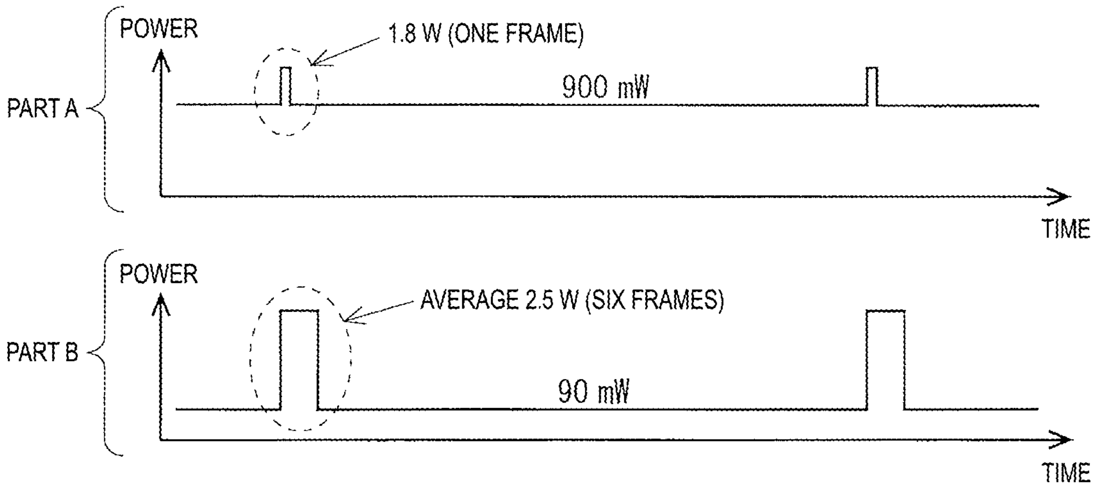
FIG. 20 is a diagram illustrating an effect of the first embodiment.

An example of the state of power consumption in the low frequency mode of the related art is shown in a part A of FIG. 20, and an example of the state of power consumption in the SP mode is shown in a part B of FIG. 20. In the low frequency mode of the related art, power in the pause period is approximately 900 mW, and power in a rewrite period is approximately 1.8 W. The length of the rewrite period is equivalent to the length of one frame period. On the other hand, in the SP mode, power in the pause period is approximately 90 mW, and power in the rewrite period is approximately 2.5 W on average. However, in the SP mode, the components and the like in the power source IC 51 are not set to be in a standby state during the pause period, and thus the length of the rewrite period is a total length (equivalent to the length of six frame periods) of the length of a period required to turn on the power source (equivalent to the length of five frame periods) and the length of a period required to actually update a display image (equivalent to the length of one frame period). In this manner, according to the SP mode, power in the rewrite period is larger than that in the low frequency mode of the related art. However, according to the SP mode, power in the pause period is approximately one tenth of that in the low frequency mode of the related art. As described above, according to the SP mode, power in the rewrite period increases, and thus the liquid crystal display device according to the present embodiment is preferably used for applications in which the frequency of updating the screen is low.

Figure 21:
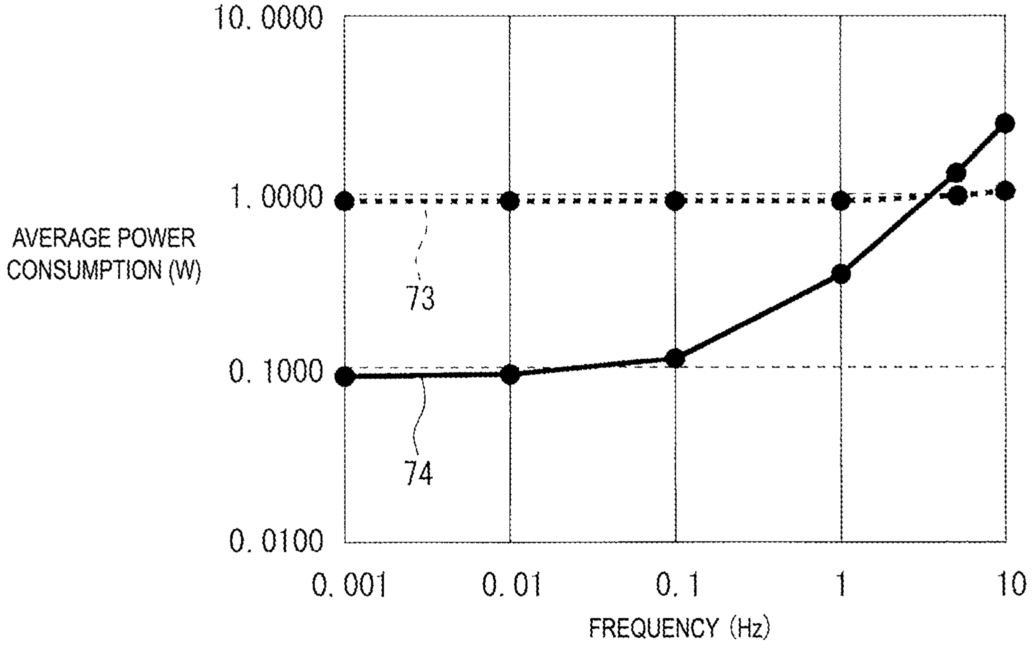
FIG. 21 is a diagram illustrating an effect of the first embodiment.

FIG. 21 is a graph showing average power consumption per frame in each of a low frequency mode of the related art and an SP mode. A thick dotted line denoted by reference numeral 73 indicates an average power consumption in the low frequency mode of the related art, and a thick solid line denoted by reference numeral 74 indicates an average power consumption in the SP mode. Incidentally, an average power consumption P per frame is calculated by the following Equation (1).

$$P=((P1\cdot F1\cdot NW)+(P2\cdot F2))/TF \quad (1)$$

Here, P1 is power in a rewrite period, F1 is the length of the rewrite period (the number of frames), NW is the number of times a display image is updated, P2 is power in a pause period, F2 is the length of the pause period (the number of frames), and TF is a total number of frames.

As a drive frequency becomes lower, a ratio of F2 to the sum of F1 and F2 becomes higher in the above Equation (1). That is, as a drive frequency becomes lower, the average power consumption P approaches the power in the pause period. From FIG. 21, it is understood that, when a drive frequency is set to 0.01 Hz in the SP mode, an average power consumption is approximately one tenth of that in the low frequency mode of the related art.

According to the present embodiment, in a first transition period for switching an operation mode from a normal mode to an SP mode, the VCOM generation unit 517 changes the potential of the common electrode drive voltage VCOM from 5 V to 12 V before changing the potential of each gate bus line GL from −7 V to 0 V by pausing the generation of the gate high power source voltage VGH and the gate low power source voltage VGL. Thereby, it is possible to prevent a leakage current from flowing through the pixel transistor 21 due to a rise in a pixel potential in each pixel forming portion 200 and the potential of each gate bus line GL being maintained at 0 V during the SP mode period. For this reason, even when ultra-low power pause driving is performed in which an operation mode is switched between the normal mode in which a drive frequency is set to 60 Hz and the SP mode in which a drive frequency is set to 0.01 Hz, display quality is not degraded as compared with the related art.

As described above, according to the present embodiment, it is possible to realize a liquid crystal display device capable of significantly reducing power consumption as compared with the related art without degrading display quality. Thus, for example, a large liquid crystal display device for signage can be used even in a place where an external power source is not provided.

2. Second Embodiment

A second embodiment will be described below. Descriptions of the same points as in the first embodiment will be omitted.

2.1 Overall Configuration

Figure 22:
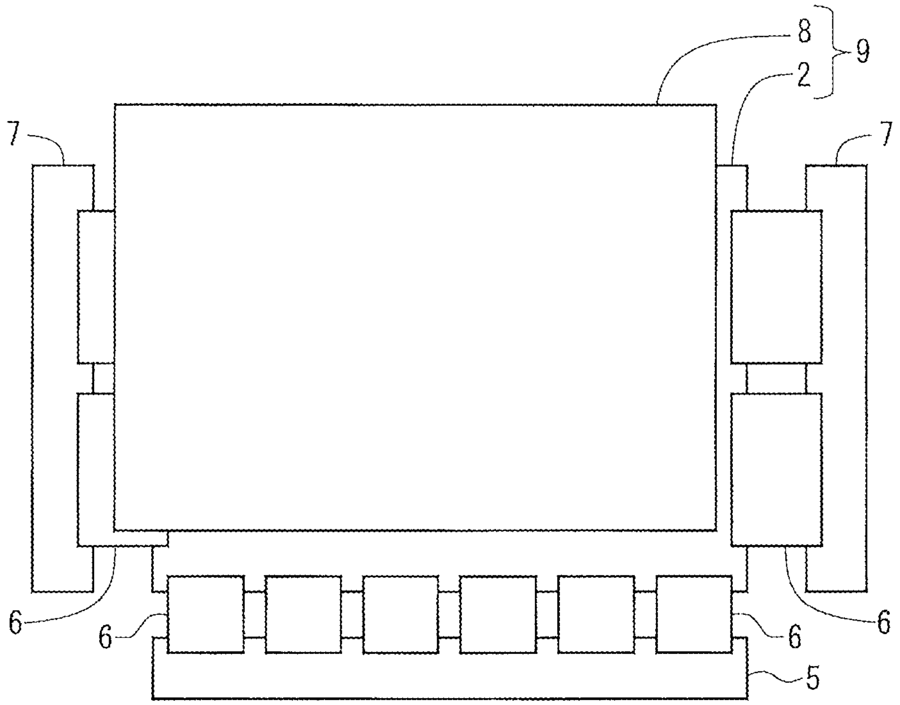
FIG. 22 is a schematic configuration diagram of a liquid crystal display device according to a second embodiment.

FIG. 22 is a schematic configuration diagram of a liquid crystal display device according to the second embodiment. This liquid crystal display device is provided with a control substrate 7 in addition to the components in the first embodiment. The control substrate 7 is provided on both one end side and the other end side of a liquid crystal panel 9. A TFT substrate 2 and the control substrate 7 are connected to each other via an FPC 6. For example, signals and the like output from components provided on a system substrate 5 are applied to a gate driver 30 via the control substrate 7.

Figure 23:
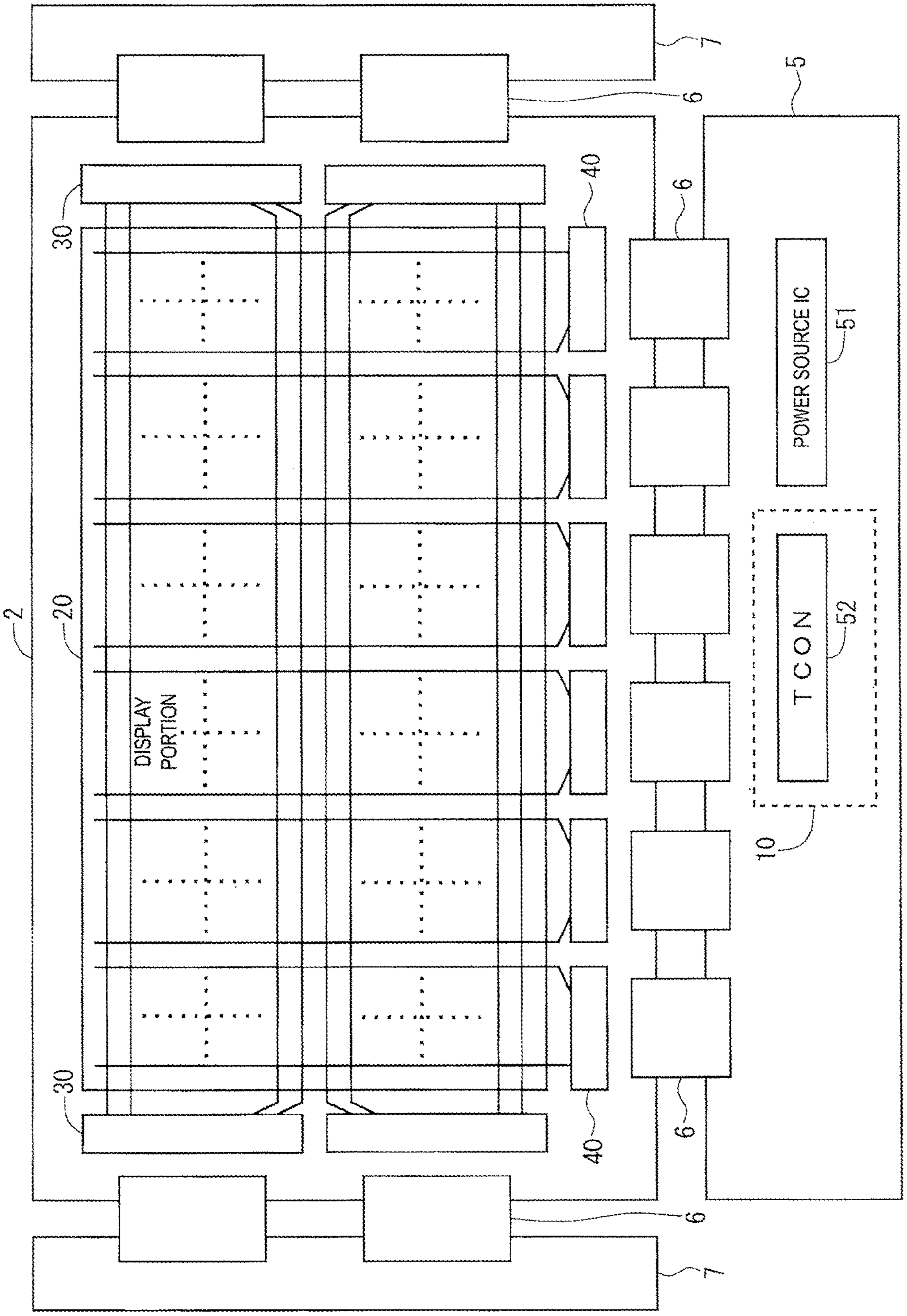
FIG. 23 is a block diagram illustrating components provided on a TFT substrate and components provided on a system substrate in the second embodiment.

FIG. 23 is a diagram illustrating components provided on the TFT substrate 2 and components provided on the system substrate 5 in the present embodiment. In the present embodiment, unlike the first embodiment, the gate driver 30 is provided on the TFT substrate 2 in the form of an IC chip (integrated circuit chip). The number of IC chips as the gate driver 30 is not particularly limited. The gate driver 30 includes, for example, a shift register and a buffer circuit. The system substrate 5 is provided with a power source IC 51 and a TCON 52. Unlike the first embodiment, the system substrate 5 is not provided with a level shifter IC 53. In the present embodiment, a display control unit 10 is realized by the TCON 52.

2.2 Configuration of System Substrate

Figure 24:
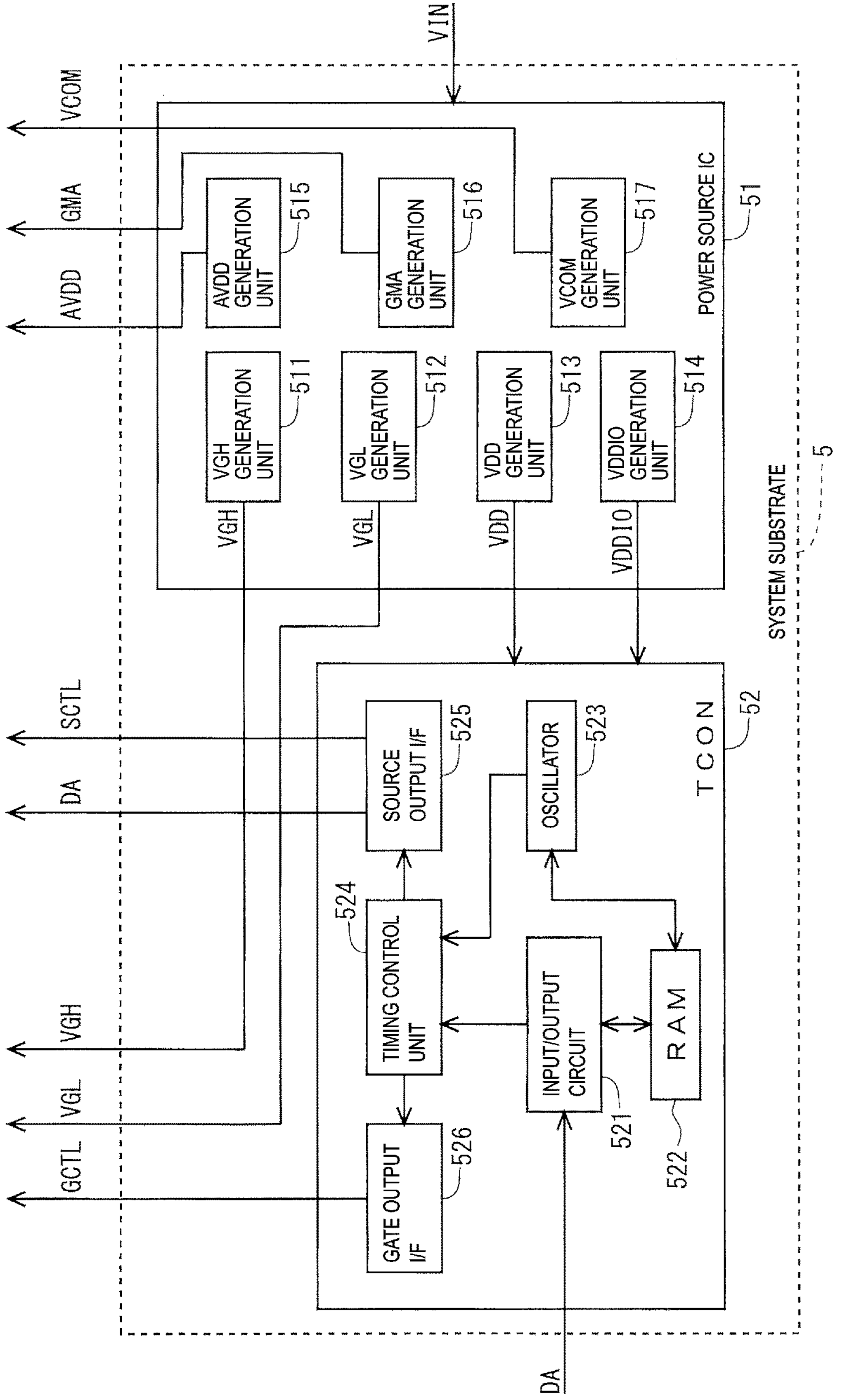
FIG. 24 is a block diagram illustrating a detailed configuration of the system substrate in the second embodiment.

FIG. 24 is a block diagram illustrating a detailed configuration of the system substrate 5 in the present embodiment. As described above, in the present embodiment, the system substrate 5 is provided with the power source IC 51 and the TCON 52.

As in the first embodiment, the power source IC 51 includes a VGH generation unit 511, a VGL generation unit 512, a VDD generation unit 513, a VDDIO generation unit 514, an AVDD generation unit 515, a GMA generation unit 516, and a VCOM generation unit 517. The TCON 52 includes a gate output interface (I/F) 526 in addition to the same components as those in the first embodiment. The gate output I/F 526 outputs a gate control signal GCTL (a gate start pulse signal and a gate clock signal).

In the present embodiment, since the level shifter IC 53 is not provided as described above, a gate high power source voltage VGH generated by the VGH generation unit 511 and a gate low power source voltage VGL generated by the VGL generation unit 512 are supplied to the gate driver 30 as power source voltages for operating the gate driver 30.

Also in the present embodiment, a first power source voltage is realized by a common electrode drive voltage VCOM, a second power source voltage is realized by a source power source voltage AVDD and a gamma power source voltage GMA, and a third power source voltage is realized by a gate high power source voltage VGH and a gate low power source voltage VGL.

2.3 Driving Method

A method of driving the liquid crystal display device according to the present embodiment will be described.

2.3.1 Operation of Liquid Crystal Display Device in Normal Mode Period

Figure 25:
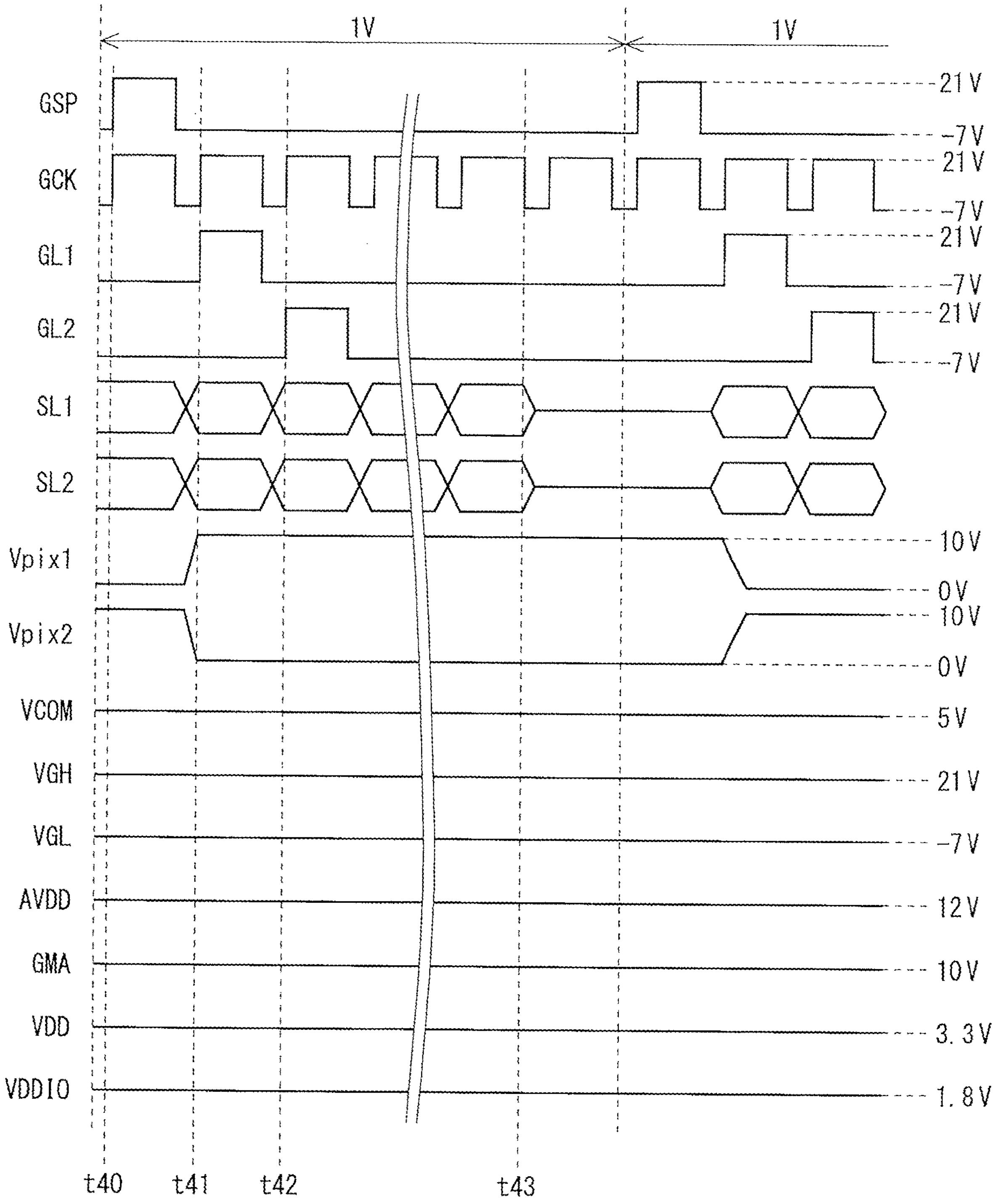
FIG. 25 is a signal waveform diagram illustrating an operation of the liquid crystal display device during a normal mode period in the second embodiment.

FIG. 25 is a signal waveform diagram in a normal mode period. As illustrated in FIG. 25, the potential of the common electrode drive voltage VCOM is maintained at 5 V, the potential of the gate high power source voltage VGH is maintained at 21 V, the potential of the gate low power source voltage VGL is maintained at −7 V, the potential of the source power source voltage AVDD is maintained at 12 V, the potential of the gamma power source voltage GMA is maintained at 10 V, the potential of a logic power source voltage VDD is maintained at 3.3 V, and the potential of an input/output power source voltage VDDIO is maintained at 1.8 V. In this manner, in a period during which an operation mode is maintained in a normal mode, the potential of the common electrode drive voltage VCOM, the potential of the gate high power source voltage VGH, the potential of the gate low power source voltage VGL, the potential of the source power source voltage AVDD, the potential of the gamma power source voltage GMA, the potential of the logic power source voltage VDD, and the potential of the input/output power source voltage VDDIO are maintained at constant values.

When the pulse of a gate start pulse signal GSP is generated at time t40 and then a gate clock signal GCK1 changes from a low level to a high level at time t41, a gate bus line GL1 in a first row is set to be in a select state, and a driving video signal is applied to pixel electrodes 22 included in pixel forming portions 200 in a first row. Thereby, similarly to time t11 (see FIG. 13) in the first embodiment, a pixel potential Vpix1 of a pixel forming portion 200 in a first row and a first column changes from 0 V to 10 V, and a pixel potential Vpix2 of a pixel forming portion 200 in a first row and a second column changes, for example, from 10 V to 0 V. At time t42, the same operation as at time t12 in the first embodiment is performed. At time t43, the writing of a driving video signal to a liquid crystal capacitance 23 in a pixel forming portion 200 in an i-th row is terminated.

When an operation mode is maintained in a normal mode, the above-described operation is repeated, and a display image is updated in each frame period.

Figure 26:
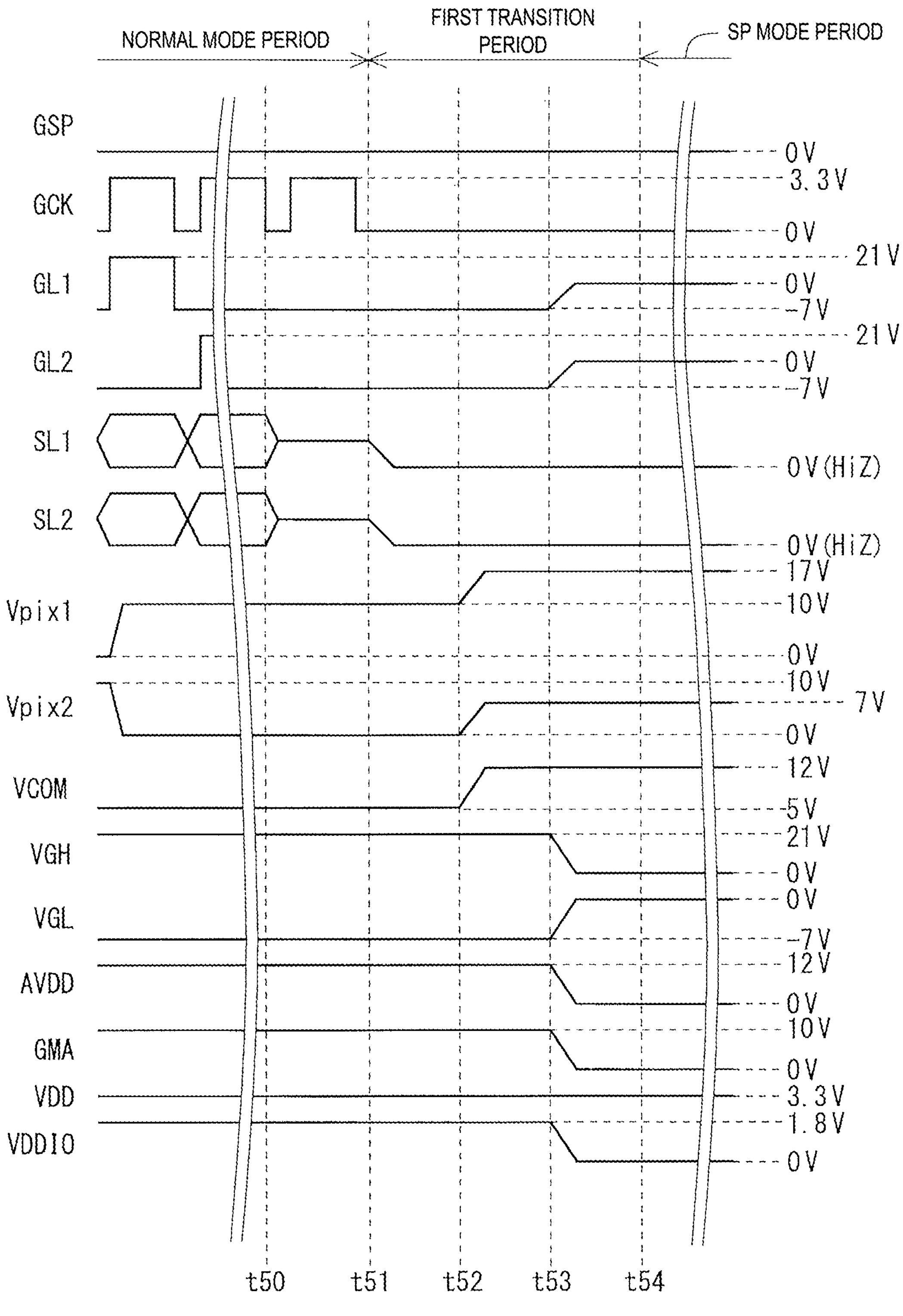
FIG. 26 is a signal waveform diagram illustrating an operation of the liquid crystal display device during a first transition period in the second embodiment.

2.3.2 Operation of Liquid Crystal Display Device when Operation Mode Transitions 2.3.2.1 Transition from Normal Mode to SP Mode FIG. 26 is a signal waveform diagram in a first transition period. After the writing of the driving video signal to the liquid crystal capacitance 23 in the pixel forming portion 200 in the i-th row is terminated at time t50, the first transition period starts at time t51. Immediately before time t51, the potential of each gate bus line GL is set to −7 V, the pixel potential Vpix1 of the pixel forming portion 200 in the first row and the first column is set to 10 V, the pixel potential Vpix2 of the pixel forming portion 200 in the first row and the second column is set to 0 V, the potential of the common electrode drive voltage VCOM is set to 5 V, the potential of the gate high power source voltage VGH is set to 21 V, the potential of the gate low power source voltage VGL is set to −7 V, the potential of the source power source voltage AVDD is set to 12 V, the potential of the gamma power source voltage GMA is set to 10 V, the potential of the logic power source voltage VDD is set to 3.3 V, and the potential of the input/output power source voltage VDDIO is set to 1.8 V. The potential of each source bus line SL is, for example, an intermediate potential between the maximum potential and the minimum potential.

At time t51, all of the source bus lines SL1 to SLj are discharged. Thereby, the potentials of all of the source bus lines SL1 to SLj are set to 0 V. Then, all of the source bus lines SL1 to SLj are set to be in a high impedance state. Since the potential of the common electrode drive voltage VCOM is maintained at 5 V in a period from time t51 to time t52, the pixel potential Vpix1 is maintained at 10 V and the pixel potential Vpix2 is maintained at 0 V.

At time t52, the VCOM generation unit 517 changes the potential of the common electrode drive voltage VCOM from 5 V to 12 V. At this time, in each pixel forming portion 200, the pixel transistor 21 is maintained in an OFF state. For this reason, when the potential of the common electrode drive voltage VCOM rises from 5 V to 12 V, a pixel potential also rises in each pixel forming portion 200. For example, the pixel potential Vpix1 rises from 10 V to 17 V, and the pixel potential Vpix2 rises from 0 V to 7 V. Since a liquid crystal application voltage does not change, a display image does not change.

At time t53, the generation of the gate high power source voltage VGH, the gate low power source voltage VGL, the source power source voltage AVDD, the gamma power source voltage GMA, and the input/output power source voltage VDDIO is stopped in the power source IC 51. Thereby, the potential of the gate high power source voltage VGH, the potential of the gate low power source voltage VGL, the potential of the source power source voltage AVDD, the potential of the gamma power source voltage GMA, and the potential of the input/output power source voltage VDDIO are set to 0 V. The potential of the logic power source voltage VDD is maintained at 3.3 V. When the potential of the gate high power source voltage VGH and the potential of the gate low power source voltage VGL are set to 0 V, the potential of each gate bus line GL is also set to 0 V.

Incidentally, at time t53, the potential of each gate bus line GL rises from −7 V to 0 V (the gate driver 30 changes the potential of each gate bus line GL from −7 V to 0 V). That is, the potential of each gate bus line GL rises by 7 V. In consideration of this, the VCOM generation unit 517 increases the potential of the common electrode drive voltage VCOM by 7 V at time t52 so that a leakage current flowing through the pixel transistor 21 is not generated during the pause period of the SP mode period. In this manner, also in the present embodiment, a variation range of the potential of the common electrode drive voltage VCOM in the first transition period is equal to a variation range of the potential of i gate bus lines GL1 to GLi in the first transition period.

After time t51, the potential of the gate start pulse signal GSP and the potential of the gate clock signal GCK are maintained at 0 V. That is, in a pause period of an SP mode period, the potential of the gate control signal GCTL for controlling the operation of the gate driver 30 is maintained at 0 V. In the pause period of the SP mode period, the power source of the timing control unit 524 (see FIG. 24) that generates the gate control signal GCTL is maintained in an OFF state.

As described above, the normal mode period transitions to the SP mode period. Similarly to the first embodiment, a display image does not change in the first transition period also in the present embodiment, and thus the display image at the end point of the normal mode period immediately before the first transition period remains displayed as is also in the SP mode period.

2.3.2.2 Transition from SP Mode to Normal Mode

Figure 27:
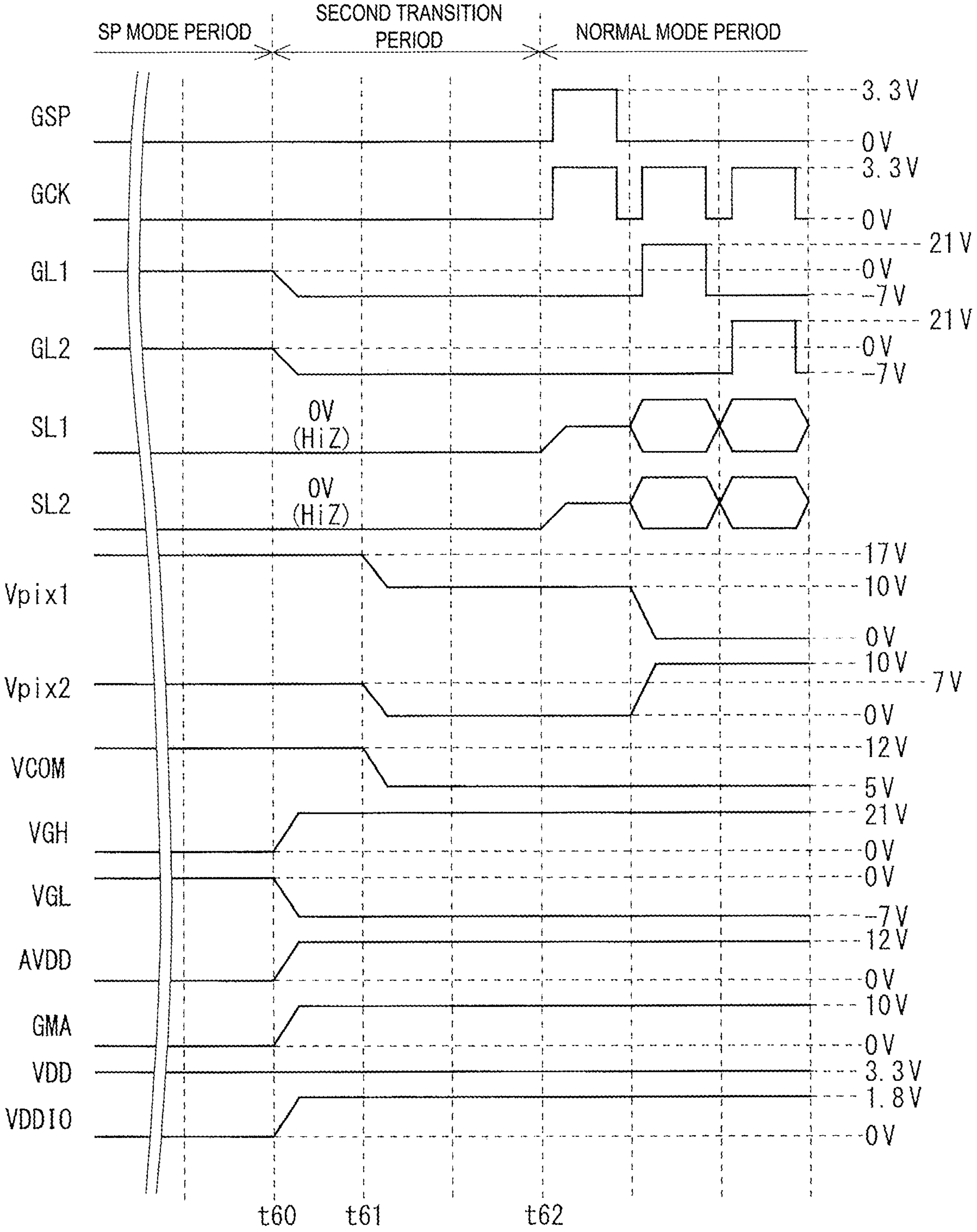
FIG. 27 is a signal waveform diagram illustrating an operation of the liquid crystal display device during a second transition period in the second embodiment.

FIG. 27 is a signal waveform diagram in a second transition period. At time t60, the generation of the gate high power source voltage VGH, the gate low power source voltage VGL, the source power source voltage AVDD, the gamma power source voltage GMA, and the input/output power source voltage VDDIO is restarted in the power source IC 51. Thereby, the potential of the gate high power source voltage VGH changes from 0 V to 21 V, the potential of the gate low power source voltage VGL changes from 0 V to −7 V, the potential of the source power source voltage AVDD changes from 0 V to 12 V, the potential of the gamma power source voltage GMA changes from 0 V to 10 V, and the potential of the input/output power source voltage VDDIO changes from 0 V to 1.8 V. When the generation of the gate high power source voltage VGH and the gate low power source voltage VGL is restarted, the potential of each gate bus line GL changes from 0V to −7 V (the gate driver 30 changes the potential of each gate bus line GL from 0 V to −7 V).

At time t61, the VCOM generation unit 517 changes the potential of the common electrode drive voltage VCOM from 12 V to 5 V. At this time, in each pixel forming portion 200, the pixel transistor 21 is maintained in an OFF state. For this reason, when the potential of the common electrode drive voltage VCOM is lowered from 12 V to 5 V, a pixel potential is also lowered in each pixel forming portion 200. For example, the pixel potential Vpix1 is lowered from 17 V to 10 V, and the pixel potential Vpix2 is lowered from 7 V to 0 V. Since a liquid crystal application voltage does not change, a display image does not change.

At time t62, the source bus lines SL are electrically connected to the source driver 40, and the potentials of the source bus lines SL become equal to a potential (for example, an intermediate potential between the maximum potential and the minimum potential) immediately before the start time (time t51 in FIG. 26) of the first transition period. In order to prevent the generation of noise, the internal state of the gate driver 30 may be initialized in a period from time t61 to time t62.

2.4 Effects

Figure 28:
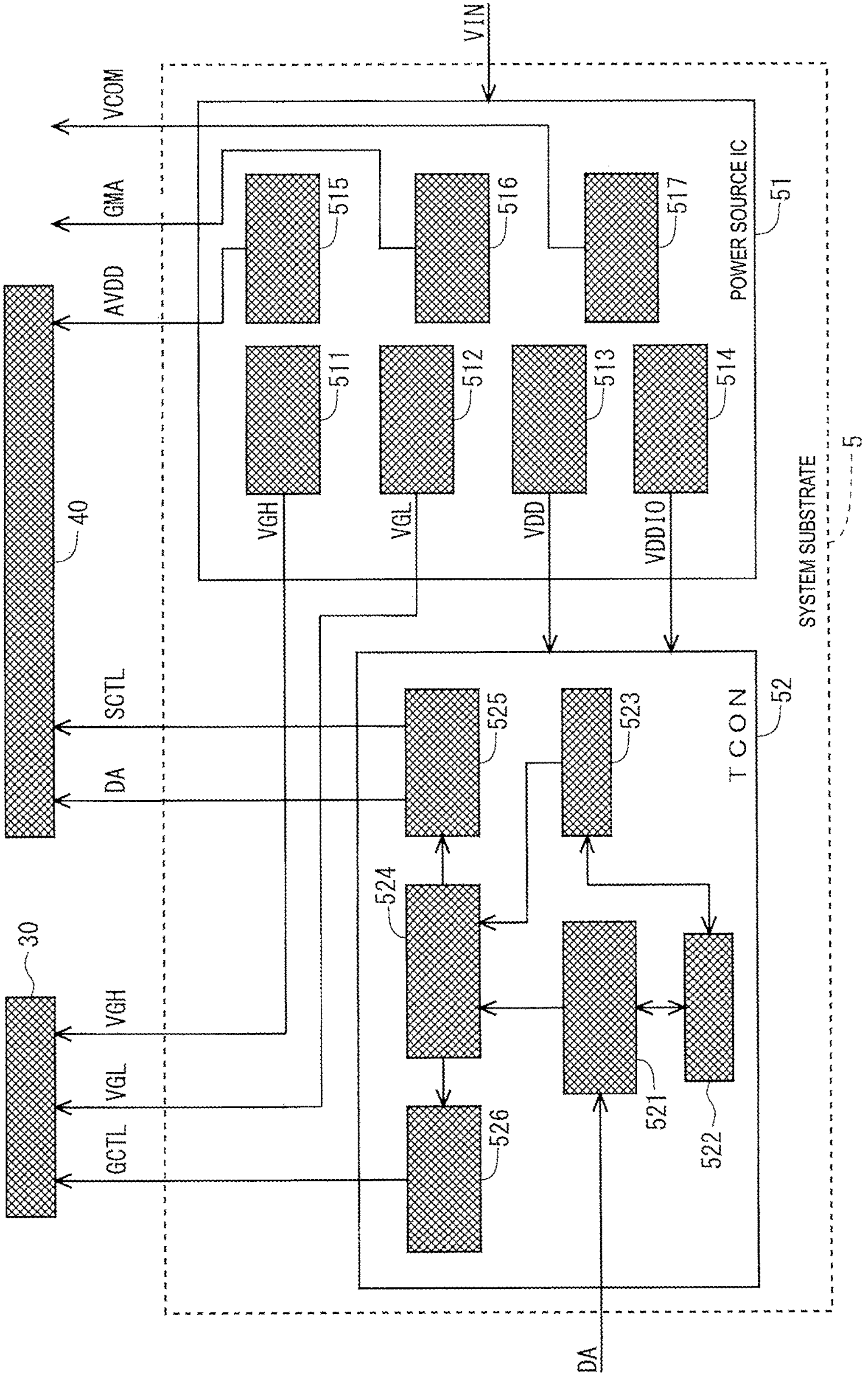
FIG. 28 is a diagram schematically illustrating the state of each component in a normal mode period in the second embodiment.
Figure 29:
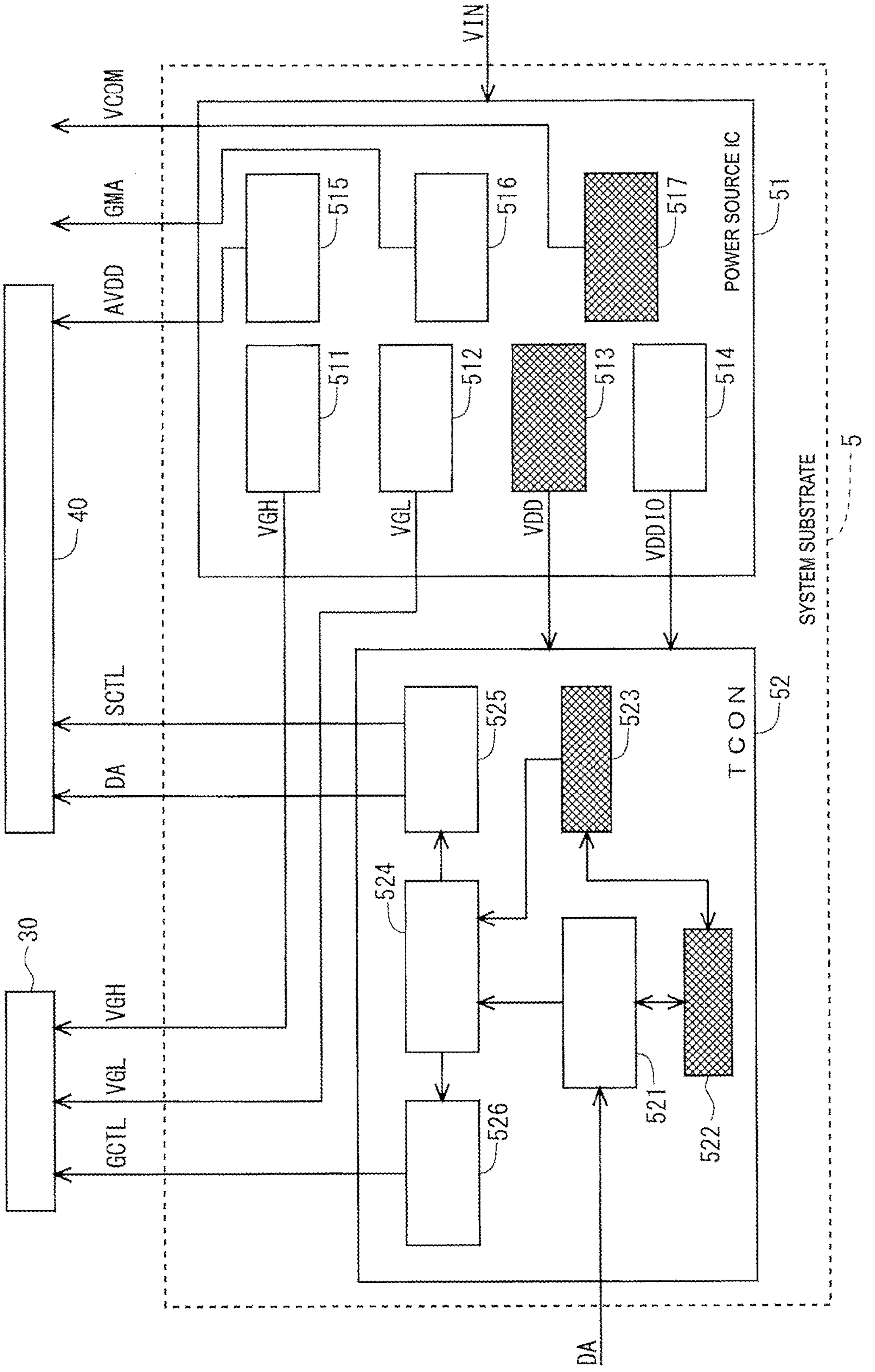
FIG. 29 is a diagram schematically illustrating the state of each component in a pause period of an SP mode period in the second embodiment.

With respect to the gate driver 30, the source driver 40, and the components provided on the system substrate 5, a difference between a state in a normal mode period and a state in a pause period of an SP mode period will be described with reference to FIGS. 28 and 29. FIG. 28 schematically illustrates a state in the normal mode period, and FIG. 29 schematically illustrates a state in the pause period of the SP mode period. In the normal mode period, all components operate as illustrated in FIG. 28. On the other hand, in the pause period of the SP mode period, the VDD generation unit 513, the VCOM generation unit 517, the RAM 522, and the oscillator 523 operate as illustrated in FIG. 29, but operations of the other components are paused. As described above, in a liquid crystal display device adopting pause driving of the related art, only the source driver 40 is set to be in a pause state during the pause period. As described above, similarly to the first embodiment, according to the SP mode, not only an AC component but also a DC component of power consumption is greatly reduced as compared with the normal mode. In this manner, according to the present embodiment as well, a liquid crystal display device capable of significantly reducing power consumption as compared with the related art is realized.

3. Modification Example

In the embodiments described above, an IGZO-TFT having a general configuration including a gate terminal, a source terminal, and a drain terminal is adopted as the pixel transistor 21. However, the disclosure is not limited thereto. Consequently, a modification example of the pixel transistor 21 will be described below.

3.1 First Modification Example

Figure 30:
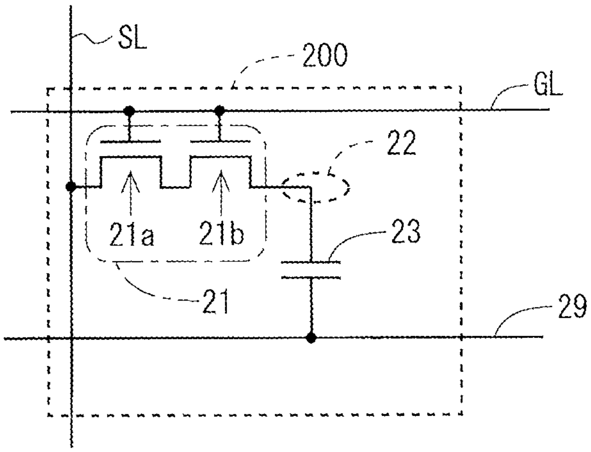
FIG. 30 is a diagram illustrating a configuration of a pixel transistor in a first modification example.

FIG. 30 is a diagram illustrating a configuration of a pixel transistor 21 in a first modification example. As illustrated in FIG. 30, the pixel transistor 21 in the present modification example is constituted by two thin film transistors 21*a* and 21*b* connected in series. That is, the pixel transistor 21 in the present modification example is a thin film transistor having a dual gate structure in which two transistors are connected in series.

Incidentally, it is necessary to maintain a display image in an SP mode period. Although a gate-source voltage of the pixel transistor 21 is set to 0 V in the SP mode period, it is necessary to prevent a leakage current from flowing through the pixel transistor 21 in order to maintain a display image. In this respect, an off-leak current is significantly small in the thin film transistor having the dual gate structure. For this reason, it is possible to effectively maintain the display image in the SP mode period by adopting the thin film transistor having the dual gate structure as the pixel transistor 21 as in the present modification example. A drive frequency in the SP mode can be set to a lower frequency.

3.2 Second Modification Example

Figure 31:
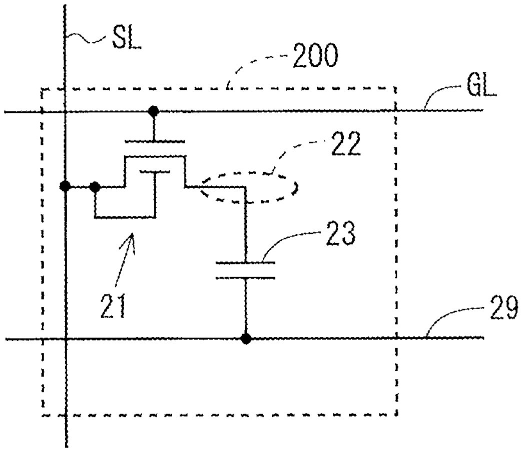
FIG. 31 is a diagram illustrating a configuration of a pixel transistor in a second modification example.

FIG. 31 is a diagram illustrating a configuration of a pixel transistor 21 in a second modification example. As illustrated in FIG. 31, the pixel transistor 21 in the present modification example is a thin film transistor having a double-gate structure including a top gate and a back gate as a control terminal. The back gate is connected to a source terminal.

The thin film transistor having the double-gate structure has a higher resistance to deterioration due to light reception and a significantly smaller off-leak current than a general thin film transistor. For this reason, it is possible to effectively maintain a display image in an SP mode period by adopting the thin film transistor having the double-gate structure as the pixel transistor 21 as in the present modification example. A drive frequency in the SP mode can be set to a lower frequency.

4. Others

Although the disclosure has been described in detail above, the above description is exemplary in all respects and is not limited thereto. It is understood that numerous other modifications or variations can be made without departing from the scope of the disclosure.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A liquid crystal display device capable of switching an operation mode between a normal mode and a low power consumption mode, the liquid crystal display device comprising:

a plurality of scanning signal lines;

a plurality of video signal lines intersecting the plurality of scanning signal lines;

a plurality of pixel forming portions, each connected to one of the plurality of scanning signal lines and one of the plurality of video signal lines;

a scanning signal line drive circuit configured to drive the plurality of scanning signal lines;

a video signal line drive circuit configured to drive the plurality of video signal lines;

a common electrode provided in common to the plurality of pixel forming portions; and a power source circuit configured to generate a first power source voltage to be supplied to the common electrode, wherein each of the plurality of pixel forming portions includes:

a pixel electrode, a pixel transistor including a control terminal connected to one of the plurality of scanning signal lines, a first conduction terminal connected to one of the plurality of video signal lines, and a second conduction terminal connected to the pixel electrode, the common electrode, and a liquid crystal capacitance formed by the pixel electrode and the common electrode, a period during which the operation mode is set to be the low power consumption mode includes a rewrite period, during which a video signal is written to the liquid crystal capacitance, and a pause period, during which a video signal is not written to the liquid crystal capacitance, in a first transition period during which the operation mode transitions from the normal mode to the low power consumption mode:

the video signal line drive circuit changes potentials of the plurality of video signal lines to 0 V in a state in which each of potentials of the plurality of scanning signal lines is at a predetermined off level, the power source circuit changes a potential of the first power source voltage from first level to a second level so that a leakage current flowing through the pixel transistor is not generated during the pause period, and the scanning signal line drive circuit changes the potentials of the plurality of scanning signal lines from the predetermined off level to 0 V, in a second transition period during which the operation mode transitions from the low power consumption mode to the normal mode:

the scanning signal line drive circuit changes the potentials of the plurality of scanning signal lines from 0 V to the predetermined off level, and the power source circuit changes the potential of the first power source voltage from the second level to the first level, a start point of the first transition period is an end point of a period, during which the operation mode is set to be the normal mode, an end point of the first transition period is a start point of the period, during which the operation mode is set to be the low power consumption mode, a start point of the second transition period is an end point of the period, during which the operation mode is set to be the low power consumption mode, and an end point of the second transition period is a start point of the period, during which the operation mode is set to be the normal mode.

2. The liquid crystal display device according to claim 1, wherein, during the pause period, the plurality of video signal lines is maintained in a high impedance state, and a power source of the video signal line drive circuit is maintained in an OFF state.

3. The liquid crystal display device according to claim 2, wherein the power source circuit is further configured to:

generate a second power source voltage to be supplied to the video signal line drive circuit, and pause the generation of the second power source voltage during the pause period.

4. The liquid crystal display device according to claim 1, wherein the scanning signal line drive circuit is monolithically formed on a substrate, and a potential of a scanning control signal for controlling an operation of the scanning signal line drive circuit is maintained at 0 V during the pause period.

5. The liquid crystal display device according to claim 4, further comprising:

a level shifter circuit configured to generate the scanning control signal, wherein a power source of the level shifter circuit is maintained in an OFF state during the pause period.

6. The liquid crystal display device according to claim 5, wherein the power source circuit is further configured to:

generate a second power source voltage to be supplied to the level shifter circuit, and pause the generation of the second power source voltage during the pause period.

7. The liquid crystal display device according to claim 1, wherein the scanning signal line drive circuit is provided in a form of an integrated circuit chip, and a potential of a scanning control signal for controlling an operation of the scanning signal line drive circuit is maintained at 0 V during the pause period.

8. The liquid crystal display device according to claim 7, further comprising:

a timing control circuit configured to generate the scanning control signal, wherein a power source of the timing control circuit is maintained in an OFF state during the pause period.

9. The liquid crystal display device according to claim 7, wherein the power source circuit is further configured to:
generate a second power source voltage to be supplied to the scanning signal line drive circuit, and
pause the generation of the second power source voltage during the pause period.

10. The liquid crystal display device according to claim 1, wherein, during the first transition period, the power source circuit changes the potential of the first power source voltage from the first level to the second level, and thereafter, the scanning signal line drive circuit changes the potentials of the plurality of scanning signal lines from the predetermined off level to 0 V.

11. The liquid crystal display device according to claim 1, wherein, during the second transition period, the scanning signal line drive circuit changes the potentials of the plurality of scanning signal lines from 0 V to the predetermined off level, and thereafter, the power source circuit changes the potential of the first power source voltage from the second level to the first level.

12. The liquid crystal display device according to claim 1, wherein the pixel transistor is a thin film transistor in which a channel layer is formed of an oxide semiconductor, the oxide semiconductor being indium gallium zinc oxide containing indium (In), gallium (Ga), zinc (Zn), and oxygen (O) as main components.

13. The liquid crystal display device according to claim 1, wherein the pixel transistor is a thin film transistor having a dual-gate structure in which two transistors are connected in series.

14. The liquid crystal display device according to claim 1, wherein the pixel transistor is a thin film transistor having a double-gate structure including a top gate and a back gate as the control terminal.

15. The liquid crystal display device according to claim 1, wherein a variation range of the potential of the first power source voltage from the first level to the second level in the first transition period is equal to a variation range of the potentials of the plurality of scanning signal lines from the predetermined off level to 0 V in the first transition period.

16. A method of driving a liquid crystal display device capable of switching an operation mode between a normal mode and a low power consumption mode,
the liquid crystal display device including:
a plurality of scanning signal lines,
a plurality of video signal lines intersecting the plurality of scanning signal lines,
a plurality of pixel forming portions, each connected to one of the plurality of scanning signal lines and one of the plurality of video signal lines,
a scanning signal line drive circuit configured to drive the plurality of scanning signal lines,
a video signal line drive circuit configured to drive the plurality of video signal lines,
a common electrode provided in common to the plurality of pixel forming portions, and
a power source circuit configured to generate a first power source voltage to be supplied to the common electrode,
wherein:
each of the plurality of pixel forming portions includes:
a pixel electrode,
a pixel transistor including a control terminal connected to one of the plurality of scanning signal lines, a first conduction terminal connected to one of the plurality of video signal lines, and a second conduction terminal connected to the pixel electrode,
the common electrode, and
a liquid crystal capacitance formed by the pixel electrode and the common electrode,
a period during which the operation mode is set to be the low power consumption mode includes a rewrite period, during which a video signal is written to the liquid crystal capacitance, and a pause period, during which a video signal is not written to the liquid crystal capacitance,
the driving method comprising:
causing the operation mode to transition from the normal mode to the low power consumption mode; and
causing the operation mode to transition from the low power consumption mode to the normal mode,
wherein causing the operation mode to transition from the normal mode to the low power consumption mode includes:
causing the video signal line drive circuit to change potentials of the plurality of video signal lines to 0 V in a state in which each of potentials of the plurality of scanning signal lines is at a predetermined off level,
causing the power source circuit to change the potential of the first power source voltage from a first level to a second level so that a leakage current flowing through the pixel transistor is not generated during the pause period, and
causing the scanning signal line drive circuit to change the potentials of the plurality of scanning signal lines from the predetermined off level to 0 V, and
causing the operation mode to transition from the low power consumption mode to the normal mode includes:
causing the power source circuit to change the potential of the first power source voltage from the second level to the first level, and
causing the scanning signal line drive circuit to change the potentials of the plurality of scanning signal lines from 0 V to the predetermined off level, and
wherein a start point of a first period, during which causing the operation mode to transition from the normal mode to the low power consumption mode is performed, is an end point of a period, during which the operation mode is set to be the normal mode,
an end point of the first period is a start point of the period, during which the operation mode is set to be the low power consumption mode,
a start point of a second period, during which causing the operation mode to transition from the low power consumption mode to the normal mode is performed, is an end point of the period, during which the operation mode is set to be the low power consumption mode, and
an end point of the second period is a start point of the period, during which the operation mode is set to be the normal mode.

* * * * *